United States Patent
Puri et al.

(10) Patent No.: US 10,347,019 B2
(45) Date of Patent: Jul. 9, 2019

(54) INTELLIGENT DATA MUNGING

(71) Applicant: Accenture Global Solutions Limited, Dublin (IE)

(72) Inventors: Colin Anil Puri, San Jose, CA (US); Sanghamitra Deb, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 164 days.

(21) Appl. No.: 15/253,480

(22) Filed: Aug. 31, 2016

(65) Prior Publication Data

US 2017/0060931 A1   Mar. 2, 2017

Related U.S. Application Data

(60) Provisional application No. 62/212,410, filed on Aug. 31, 2015.

(51) Int. Cl.
| | |
|---|---|
| G06F 16/23 | (2019.01) |
| G06N 20/00 | (2019.01) |
| G06Q 10/06 | (2012.01) |
| G06T 11/20 | (2006.01) |

(52) U.S. Cl.
CPC .......... *G06T 11/206* (2013.01); *G06F 16/23* (2019.01); *G06N 20/00* (2019.01); *G06Q 10/063* (2013.01)

(58) Field of Classification Search
CPC .... G06T 11/206; G06Q 10/00; G06Q 10/063; G06F 17/30345; G06F 16/23; G06N 99/005; G06N 20/00
See application file for complete search history.

(56) References Cited

U.S. PATENT DOCUMENTS

| | | | |
|---|---|---|---|
| 9,984,152 B2 * | 5/2018 | Nassar | ............. G06F 17/30734 |
| 2006/0238919 A1 | 10/2006 | Bradely | |
| 2011/0110515 A1 | 4/2011 | Tidwell | |
| 2011/0302124 A1 | 12/2011 | Cai | |

(Continued)

OTHER PUBLICATIONS

Kandel, S. et al., "Wrangler:Interactive visual specification of data transformation scripts." Proceedings of the SIGCHI Conference on Human Factors in Computing Systems. ACM, 2011. [retrieved from internet on Oct. 25, 2016]. 10 pages. <URL: http://datascienceassn.org/sites/default/files/Wrangler%20Interactive%20Visual%20Speci%EF%AC%81cation%20of%20Data%20Transformation%20Scripts.pdf>.

(Continued)

*Primary Examiner* — Jorge A Casanova
(74) *Attorney, Agent, or Firm* — Mannava & Kang, P.C.

(57) ABSTRACT

According to examples, intelligent data munging may include ascertaining data that is to be transformed, and determining, based on an analysis of the ascertained data, a sample of the ascertained data. Intelligent data munging may further include enriching the sample of the ascertained data, determining features of the enriched sample of the ascertained data, and determining, based on the features, a transformation to be applied to the enriched sample of the ascertained data to transform the enriched sample of the ascertained data from a first format to a second format. Further, intelligent data munging may include validating the determined transformation, and generating, based on the validation of the determined transformation, a script that is to be applied to the ascertained data to transform the ascertained data from the first format to the second format.

20 Claims, 15 Drawing Sheets

(56) References Cited

U.S. PATENT DOCUMENTS

| | | | |
|---|---|---|---|
| 2012/0123924 A1 | 5/2012 | Rose | |
| 2013/0151383 A1 | 6/2013 | Gancarz | |
| 2013/0222387 A1 | 8/2013 | Bradshaw | |
| 2014/0025597 A1* | 1/2014 | Brikman | G06Q 50/01 705/321 |
| 2014/0071138 A1 | 3/2014 | Gibson et al. | |
| 2014/0101093 A1 | 4/2014 | Lanphear | |
| 2014/0115013 A1 | 4/2014 | Anderson | |
| 2015/0160373 A1* | 6/2015 | Feldman-Fitzthum | G01W 1/10 702/3 |
| 2015/0205692 A1* | 7/2015 | Seto | G06F 11/3452 702/182 |
| 2015/0356123 A1* | 12/2015 | Gorelik | G06F 17/30297 715/765 |
| 2016/0055574 A1 | 2/2016 | Rangarajan | |
| 2016/0103920 A1* | 4/2016 | Lee | G06F 17/30867 707/706 |
| 2016/0188663 A1* | 6/2016 | Tsumura | G06F 17/30536 715/771 |

OTHER PUBLICATIONS

Knoblock, C. et al. "Semantics for Big Data Integration and Analysis." 2013 AAAI Fall Symposium Series, Nov. 12, 2013. [retrieved from internet on Oct. 25, 2016]. 4 pages. <URL: http://www.isi.edu/integration/papers/knoblock13-sbd.pdf>.

Heer, J. et al. "Predictive Interaction for Data Transformation." Conference on Innovative Data Systems Research (CIDR), Jan. 4-7, 2015. [retrieved from internet on Oct. 25, 2016]. 7 pages. <URL: https://pdfs.semanticscholar.org/a3f7/06941ada1a6420db9855bf8c3fe680f50cb7.pdf>.

Guo, P., et al. "Proactive wrangling: mixed-initiative end-user programming of data transformation scripts." Proceedings of the 24th annual ACM symposium on User interface software and technology. ACM, 2011. [retrieved from internet on Oct. 25, 2016]. 10 pages. <URL: http://db.cs.berkeley.edu/papers/uist11-wrangler.pdf>.

Gotz, D. et al., Behavior-Driven Visualization Recommendation, Proceeding of the 14th International Conference on Intelligent User Interfaces, ACM, 2009, pp. 315-324 [retrieved from internet on Dec. 6, 2016] <URL:http://gotz.web.unc.edu/files/2013/10/gotz_iui_2009.pdf>.

Voigt, M. et al., "Context-aware Recommendation of Visualization Components", Proceedings of the Fourth International Conference on Information, Process and Knowlegde Management, 2012, pp. 101-109 [retrieved from internet on Dec. 6, 2016] <URL:http://larsgrammel.de/publications/voigt_2012_vis_recommendation.pdf>.

* cited by examiner

FIG. 6

| BCode | ID | Cust | Address_1 | Address | Address_City | State | Zip | Country | Create_Date | Last_Modified | Flag |
|---|---|---|---|---|---|---|---|---|---|---|---|
| PTNR | 81831 | Linkbyn | 39, bd Anatole France | | Saint-Denis | | 93200 | FRA | 11/9/05 1:07 | 12/1/05 11:02 | Y |
| PTNR | 34861 | enmed | 16 New England Executive Park | | Burlington | MA | 1803 | USA | 11/9/05 1:07 | 12/1/05 11:02 | Y |
| PTNR | 84631 | BiblioM | 3600 Thimens Blvd | | Ville St Laur | QC | H4R 1V6 | CAN | 11/9/05 1:07 | 12/1/05 11:02 | Y |
| PTNR | 83921 | Intervet | Angers Technopole rue Olivier | BP 67131 | Beaucouze Cedex | | 49071 | FRA | 11/9/05 1:07 | 12/1/05 11:02 | Y |
| PTNR | 82891 | Lexis N | 141 rue de Javel | | Paris Cedex 15 | | 75747 | FRA | 11/9/05 1:07 | 12/1/05 11:02 | Y |
| PTNR | 82031 | Conseil | 102 Grand Rue | BP. 553 | Poitiers | | 86020 | FRA | 11/9/05 1:07 | 12/1/05 11:02 | Y |
| PTNR | 81341 | Criteria | 3303 Greenglen Circle | | Carrollton | TX | 75007 | USA | 11/9/05 1:07 | 12/1/05 11:02 | Y |
| PTNR | 80541 | EDF Dir | 67, avenue de Wagram | | Paris | | 75017 | FRA | 11/9/05 1:07 | 12/1/05 11:02 | Y |
| PTNR | 45294 | SWORD | 37 rue de Lyon | | Paris | | 75012 | FRA | 11/9/05 1:07 | 12/1/05 11:02 | Y |

Acquire Data Sample

ID:int

Address_1:num, text

State: 2char

Create_Date: Date-Time

GET A SMALL VIEW OF THE FIRST FEW LINES OF THE DATA AND MAKE CONCLUSIONS

ID:int

Address_1:num, text

State: 2char

Create_Date Date-Time

| BCode | ID | Cust | Address_1 | Address | Address_5 | City | State | Zip | Country | Create_Date | Last_Modified | Flag |
|---|---|---|---|---|---|---|---|---|---|---|---|---|
| PTNR | 81831 | Linkbyn | 39, bd Anatole | France | | Saint-Denis | | 93200 | FRA | 11/9/05 1:07 | 12/1/05 11:02 | Y |
| PTNR | 34861 | enmed | 16 New England | Executive Park | | Burlington | MA | 1803 | USA | 11/9/05 1:07 | 12/1/05 11:02 | Y |
| PTNR | 84631 | BiblioM | 3600 Thimens Blvd | | | Ville St Laur | QC | H4R 1V6 | CAN | 11/9/05 1:07 | 12/1/05 11:02 | Y |
| PTNR | 83921 | Interve | Angers Technopole | rue Oliv | BP 67131 | Beaucouze Cedex | | 49071 | FRA | 11/9/05 1:07 | 12/1/05 11:02 | Y |
| PTNR | 82891 | Lexis N | 141 rue de Javel | | | Paris Cedex 15 | | 75747 | FRA | 11/9/05 1:07 | 12/1/05 11:02 | Y |
| PTNR | 82031 | Consei | 102 Grand Rue | BP. 553 | | Poitiers | | 86020 | FRA | 11/9/05 1:07 | 12/1/05 11:02 | Y |
| PTNR | 81341 | Criteria | 3303 Greengler | Circle | | Carrollton | TX | 75007 | USA | 11/9/05 1:07 | 12/1/05 11:02 | Y |
| PTNR | 80541 | EDF Dir | 67, avenue de | Wagram | | Paris | | 75017 | FRA | 11/9/05 1:07 | 12/1/05 11:02 | Y |
| PTNR | 45234 | SWORD | 37 rue de Lyon | | | Paris | | 75012 | FRA | 11/9/05 1:07 | 12/1/05 11:02 | Y |

INTELLIGENT DATA MUNGING

CROSS-REFERENCE TO RELATED APPLICATION(S)

This application claims the benefit of Provisional Patent Application Ser. No. 62/212,410, filed Aug. 31, 2015, which is expressly incorporated herein by reference.

BACKGROUND

Data munging may be described as the process of converting or mapping data from one raw form into another format that allows for consumption of the data. For example, the data may be consumed for display in a visual or another type of format to facilitate comprehension of the data.

BRIEF DESCRIPTION OF DRAWINGS

Features of the present disclosure are illustrated by way of examples shown in the following figures. In the following figures, like numerals indicate like elements, in which:

FIG. 6 illustrates a data sample for the intelligent data munging system of FIG. 1, according to an example of the present disclosure;

FIG. 8 illustrates data profiling for the intelligent data munging system of FIG. 1, according to an example of the present disclosure;

DETAILED DESCRIPTION

Figure 1:
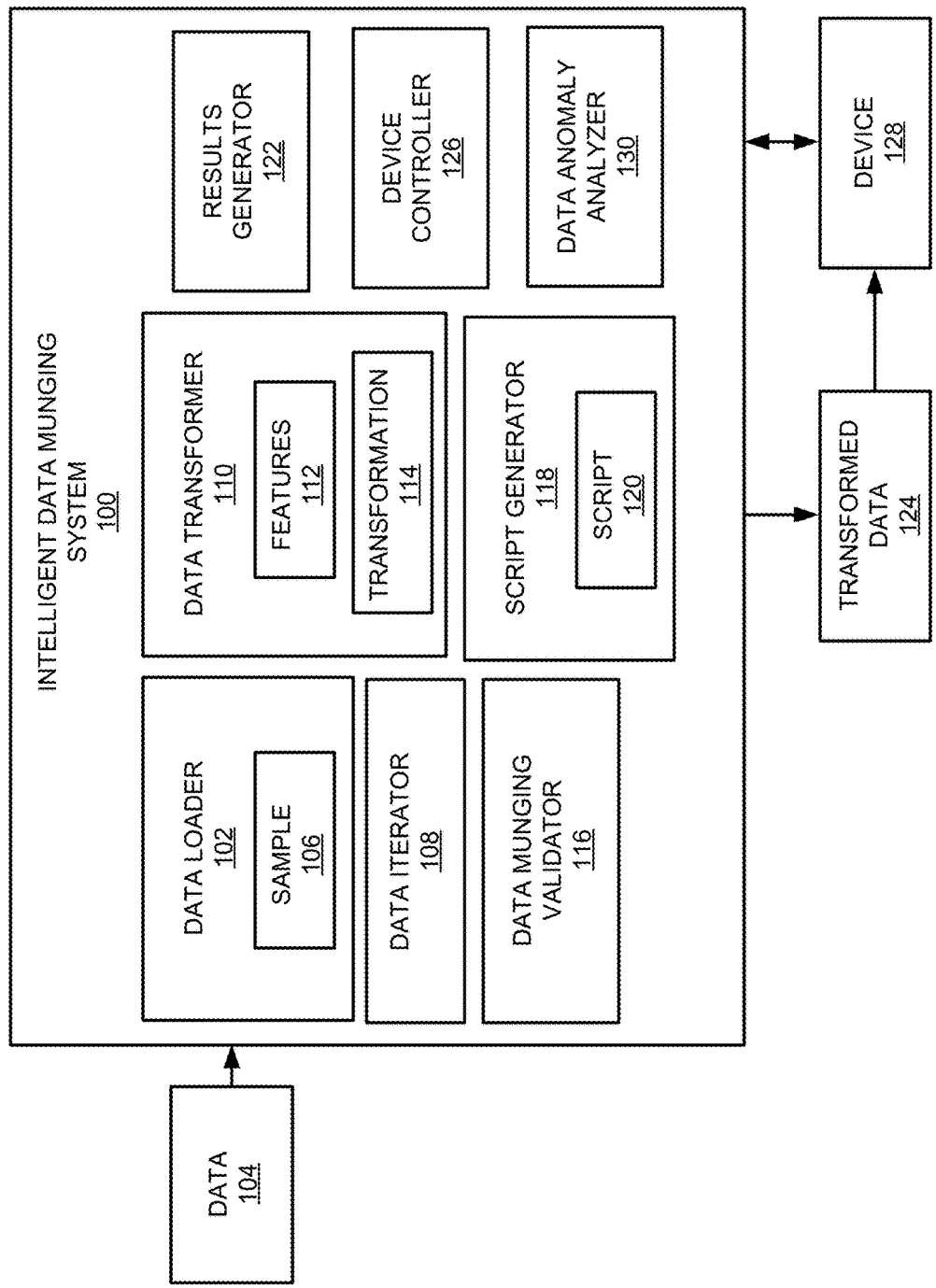
FIG. 1 illustrates an intelligent data munging system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, methods and structures apparent to one of ordinary skill in the art have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, an intelligent data munging system, a method for intelligent data munging, and a non-transitory computer readable medium having stored thereon a computer executable program to provide intelligent data munging are disclosed herein. The system, method, and non-transitory computer readable medium disclosed herein may include a data loader to ascertain data that is to be transformed, and determine, based on an analysis of the ascertained data, a sample of the ascertained data. The sample of the ascertained data may be less than the ascertained data. A data iterator may enrich the sample of the ascertained data. A data transformer may determine features of the enriched sample of the ascertained data, and determine, based on the features of the enriched sample of the ascertained data, a transformation to be applied to the enriched sample of the ascertained data to transform the enriched sample of the ascertained data from a first format to a second format. The transformation may be determined from a plurality of available transformations. A data munging validator may validate the determined transformation. A script generator may generate, based on the validation of the determined transformation, a script that is to be applied to the ascertained data to transform the ascertained data from the first format to the second format. A results generator may generate a display including the ascertained data and the transformed data.

Data munging may be described as the extraction, transformation, and loading (ETL) of data while analyzing a form of the data to create a targeted structure, infer statistics of data, and uncover insights faster at scale through usage of machine learning, pattern recognition, and artificial intelligence (AI) techniques. Data discovery and exploration are a part of data munging with the goal of analyzing the data. Thus data munging pertains to the gathering and organization of varied data sets from different sources, and the transformation and mapping of the data sets to a useful format. The data munging process may provide for the extraction of insights, and/or the making of predictions from data. An analysis may be misleading if the underlying data is flawed or incorrectly formatted.

Data munging may include a variety of technical challenges, such as, for example, including capabilities for showing the history and lineage of data set modifications, providing for the history to lead to collaboration by making the history sharable and editable, and including the ability to munge a small sample and then distributing the transformations across a computing cluster. Data munging may also include technical challenges related, for example, to leveraging automation, collaboration, and institutional memory.

According to examples, with respect to technical challenges related, for example, to data munging, with respect to selecting and deciding the correct extractions and data transformations for a given data, the system, method, and non-transitory computer readable medium disclosed herein may provide for correct extraction and normalization of data in such a way as to be sufficiently flexible, but provide the semantic and syntactic information that is needed for insight and visualization.

The system, method, and non-transitory computer readable medium disclosed herein may provide for correct transformations(s) from a set of a plurality (e.g., hundreds) of transformations.

The system, method, and non-transitory computer readable medium disclosed herein may provide for tailoring of results of the data set(s), and extraction of relevant semantic and syntactic information.

The system, method, and non-transitory computer readable medium disclosed herein may provide for an understanding of consequences of and learning of the correct transformation operation(s).

Further, the system, method, and non-transitory computer readable medium disclosed herein provides for the performance of tasks with high responsivity (e.g., low latency).

According to examples, with respect to technical challenges related, for example, to data munging, the system, method, and non-transitory computer readable medium disclosed herein discovers and extracts semantic and syntactic information on data sets.

The system, method, and non-transitory computer readable medium disclosed herein provides recommendations on the right transformations to be performed.

The system, method, and non-transitory computer readable medium disclosed herein provide recommendations using sparse/impoverished information on dataset features.

The system, method, and non-transitory computer readable medium disclosed herein may learn common behaviors to create profiles that lead to utilization of certain sets of ETL operations.

The system, method, and non-transitory computer readable medium disclosed herein may perform operations in real-time, low latency, and/or in a streaming manner.

According to examples, the system, method, and non-transitory computer readable medium disclosed herein may ingest data, discover features, match features against previous known dataset types and features, and recommend the best transformations to be applied based on use cases and data domains. Features may be extracted and discovered through semantic and syntactic processes.

According to examples, the system, method, and non-transitory computer readable medium disclosed herein may provide incorporation of data about users (e.g., who are they, who do they normally present to, etc.). This demographic information may be used to improve predictive performance by tailoring results of the data munging for the audience.

The system, method, and non-transitory computer readable medium disclosed herein may generate results with limited information. Further, the system, method, and non-transitory computer readable medium disclosed herein may learn from user feedback and new use cases to improve the results that are generated over time.

According to examples, with respect to technical challenges related, for example, to data munging, the system, method, and non-transitory computer readable medium disclosed herein may provide for tailoring of results for the correct data set(s). The system, method, and non-transitory computer readable medium disclosed herein may provide for the comprehension of consequences of and learning the correct transformation operation(s). The system, method, and non-transitory computer readable medium disclosed herein may provide for performance of tasks with high responsivity (i.e., low latency), and operation in an information-impoverished environment (i.e., with little to no existing recommendations, ontological, reference information, and/or rules).

According to examples, the system, method, and non-transitory computer readable medium disclosed herein may be part of a design pipeline denoted Industrializing D3 (or ID3). In this regard, the system, method, and non-transitory computer readable medium disclosed herein may simplify the data munging process by guiding users through a set of steps from data ingestion to data munging. The system, method, and non-transitory computer readable medium disclosed herein may reduce the dimensionality of the dataset into a predetermined set of features.

The system, method, and non-transitory computer readable medium disclosed herein provide technical solutions to technical problems, related, for example, to intelligent data munging. For example, with respect to Extract, Transform and Load (ETL), data extraction refers to the extraction of data from homogeneous or heterogeneous data sources, data transformation refers to the transformation of the data for storing the data in a specified format or structure, where the stored data may be used for querying and further analysis, and data loading refers to the loading of the data into a target destination, such as, a database, etc. With respect to ETL, the system, method, and non-transitory computer readable medium disclosed herein provide technical solutions to technical problems, related, for example, to transformation of data to a format for storing the data in a specified format or structure, where the stored data may be used for querying and further analysis. For example, with respect to ETL, the data may be transformed to reduce the usage of computer resources that are otherwise used to analyze the data prior to transformation. In this regard, the system, method, and non-transitory computer readable medium disclosed herein may be used with any type of operation associated with ETL.

The system, method, and non-transitory computer readable medium disclosed herein further provide technical solutions to technical problems, related, for example, to control of a device based on the transformed data. For example, the transformed data may be queried to authenticate and thus control a device (or operations associated with a device) such as an automatic teller machine (ATM). Based on feedback from the device (e.g., a confirmed authentication, etc.), the system, method, and non-transitory computer readable medium disclosed herein may further control operation of the device, and/or other associated devices.

The system, method, and non-transitory computer readable medium disclosed herein further provide technical solutions to technical problems, related, for example, to visualization of the data. In this regard, once transformed, the data may be disposed in a format that is suitable for visualization, for example, by a user associated with the data.

The system, method, and non-transitory computer readable medium disclosed herein further provide technical solutions to technical problems, related, for example, to real-time anomaly detection in data, such as log file data. In many instances, anomaly detection in log file data can be a daunting task, for example, due to the extensive volume of such log files. The system, method, and non-transitory computer readable medium disclosed herein provide the technical solution of accessing data that is to be analyzed for an anomaly, transforming the accessed data, and detecting an anomaly in the transformed data. Absent the transformation of the data, the anomaly may not otherwise be detectable. Further, in response to a determination that the data includes the anomaly, a device associated with the data may be controlled. In this regard, the system, method, and non-transitory computer readable medium disclosed herein provide the technical solution to a technical problem of detection of an anomaly and/or controlling a device based on detection of an anomaly. For example, a device, such as an automatic teller machine (ATM) may be controlled to initiate a lock-down mode based on the detection of an anomaly related to access to the ATM. Alternatively or additionally, a firewall associated with the data and/or the device may be controlled to place a network in a secure mode. Thus, any type of device may be controlled based on detection of an anomaly related to operation of the device.

FIG. 1 illustrates an intelligent data munging system 100 (e.g., system 100 as disclosed herein), according to an example of the present disclosure. Referring to FIG. 1, the system 100 may include a data loader 102 to ascertain data 104 that is to be transformed. Further, the data loader 102 may determine, based on an analysis of the ascertained data 104, a sample 106 of the ascertained data 104. The sample 106 of the ascertained data 104 may be less than the ascertained data 104. The data loader 102 may be designated as a data hardware loader 102 that includes a hardware processing circuit, to execute the methods, functions and other processes described herein, or alternatively, the data loader 102 may be executed by at least one hardware processor (e.g., the processor 1102 of FIG. 11 and/or the processor 1304 of FIG. 13).

A data iterator 108 may enrich the sample 106 of the ascertained data 104. The enrichment may include any type of modification of the data 104 (e.g., to complete or add state and city information based on zip code information), to complete and/or otherwise add further details to the data 104. The data iterator 108 may be designated as a data hardware iterator 108 that includes a hardware processing circuit, to execute the methods, functions and other processes described herein, or alternatively, the data iterator 108 may be executed by at least one hardware processor (e.g., the processor 1102 of FIG. 11 and/or the processor 1304 of FIG. 13).

A data transformer 110 may determine features 112 of the enriched sample of the ascertained data 104. Further, the data transformer 110 may determine, based on the features 112 of the enriched sample of the ascertained data 104, at least one transformation 114 to be applied to the enriched sample of the ascertained data 104 to transform the enriched sample of the ascertained data 104 from a first format to a second format. A transformation may be described as any type of process where the data 104 is divided in different formats based on a particular type of feature, combined based on a particular type of feature, where a mathematical operation is applied to the data 104 (e.g., an exponential operation applied to data), where any format change is performed to make the data 104 ready for another operation (e.g., learning), etc. The transformation 114 may be determined from a plurality of available transformations. The data transformer 110 may be designated as a data hardware transformer 110 that includes a hardware processing circuit, to execute the methods, functions and other processes described herein, or alternatively, the data transformer 110 may be executed by at least one hardware processor (e.g., the processor 1102 of FIG. 11 and/or the processor 1304 of FIG. 13).

A data munging validator 116 may validate the determined transformation 114. For example, the data munging validator 116 may validate the determined transformation 114 based on historical data by determining whether a similar transformation has been previously applied to similar data. The data munging validator 116 may be designated as a data munging hardware validator 116 that includes a hardware processing circuit, to execute the methods, functions and other processes described herein, or alternatively, the data munging validator 116 may be executed by at least one hardware processor (e.g., the processor 1102 of FIG. 11 and/or the processor 1304 of FIG. 13).

A script generator 118 may generate, based on the validation of the determined transformation 114, at least one script 120 that is to be applied to the ascertained data 104 to transform the ascertained data 104 from the first format to the second format. In this regard, a script may be described as any process that includes a set of steps that are used to perform a specified operation (e.g., transformation of the ascertained data 104 from the first format to the second format). The script generator 118 may be designated as a script hardware generator 118 that includes a hardware processing circuit, to execute the methods, functions and other processes described herein, or alternatively, the script generator 118 may be executed by at least one hardware processor (e.g., the processor 1102 of FIG. 11 and/or the processor 1304 of FIG. 13).

A results generator 122 may generate, based on the validation of the determined transformation 114, a display including the ascertained data 104 and transformed data 124 that is generated based on application of the script 120 to the ascertained data 104. The results generator 122 may be designated as a results hardware generator 122 that includes a hardware processing circuit, to execute the methods, functions and other processes described herein, or alternatively, the results generator 122 may be executed by at least one hardware processor (e.g., the processor 1102 of FIG. 11 and/or the processor 1304 of FIG. 13).

A device controller 126 may control a device 128 (or operations associated with the device 128) based on the transformed data 124. For example, the transformed data 124 may be queried to authenticate and thus control the device 128 such as an automatic teller machine (ATM). Based on feedback from the device 128 (e.g., a confirmed authentication, etc.), the device controller 126 may further control operation of the device 128, and/or other associated devices. The device controller 126 may be designated as a device hardware controller 126 that includes a hardware processing circuit, to execute the methods, functions and other processes described herein, or alternatively, the device controller 126 may be executed by at least one hardware processor (e.g., the processor 1102 of FIG. 11 and/or the processor 1304 of FIG. 13).

According to an example, a data anomaly analyzer 130 may access data 104 that is to be analyzed for an anomaly. The data 104 may include log file data. The data anomaly analyzer 130 may determine, based on the transformed data 124, whether the data 104 includes the anomaly. In response to a determination that the data 104 includes the anomaly, the device controller 126 may control the device 128 associated with the data 104. The device 128 may include a device that supplies the data 104, or a device that does not supply the data 104, but is controlled by the device controller 126. The device 128 may include any type of device including a processor capable of executing machine-readable instructions to perform one or more operations. Alternatively or additionally, a firewall associated with the data 104 and/or the device 128 may be controlled to place a network in a secure mode. The data anomaly analyzer 130 may be designated as a data anomaly hardware analyzer 130 that includes a hardware processing circuit, to execute the methods, functions and other processes described herein, or alternatively, the data anomaly analyzer 130 may be executed by at least one hardware processor (e.g., the processor 1102 of FIG. 11 and/or the processor 1304 of FIG. 13).

Figure 2:
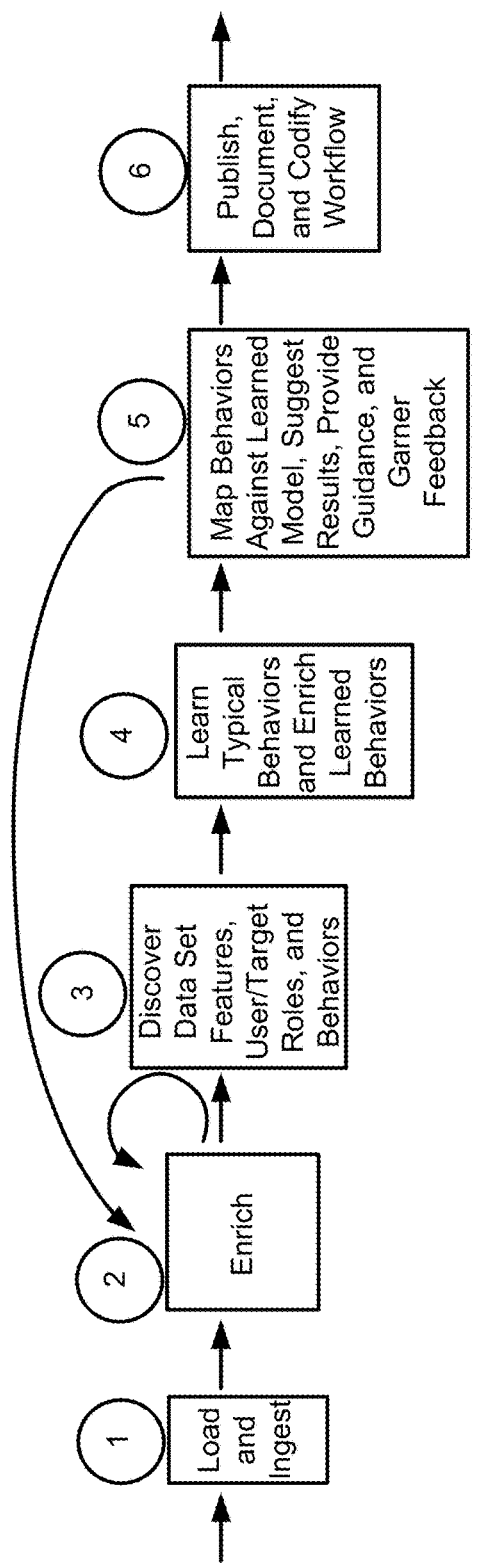
FIG. 2 illustrates a logic flow for the intelligent data munging system of FIG. 1, according to an example of the present disclosure.

FIG. 2 illustrates a logic flow for the system 100, according to an example of the present disclosure.

Referring to FIG. 2, at location #1, the data loader 102 may ascertain the data 104 that is to be transformed. Further, the data loader 102 may determine, based on an analysis of the ascertained data 104, the sample 106 of the ascertained data 104. For example, the data loader 102 may load and ingest security log traces (e.g., 114.135.67.66,,,, 583064f457f9de54307835f738ab09c671e596dd5db6b40b-0d3a9e102e256bee,3ZUB5Zj8BABCAA7H4FDTC+Q). Further, the data loader 102 may determine whether a type and/or structure of the data 104 has been ascertained before.

At location #2, the data iterator 108 may enrich the sample 106 of the ascertained data 104. For example, the data iterator 108 may munge results, extract information, and perform merges (i.e., iterative approach while trying to understand data). For example, the enriched security log traces may be specified as: foobar.com+114.135.67.66,,,, 583064f457f9de54307835f738ab09c671e596dd5db6b40b-0d3a9e102e256bee,3ZUB5Zj8BABCAA7H4FDTC+Q==,,, 20 Feb 2014 22:59:09 EST,Low,US/Eastern,-18000000,,,,,,,,superagent_ng,5.2.5.6403.0, etc. In this example, the internet protocol (IP) address "foobar.com" may be merged with the ingested data from location #1. According to another example, assuming that the data 104 includes states and cities separated by a comma, a transformation may include removal of the comma, and separation of the state and city information. The state information may be discovered, for example, based on an analysis of patterns of state abbreviations. With respect to enrichment of the data 104, assuming that the data includes state and zip code information, the zip code information may be used to enrich the data 104 by determining city information, or otherwise completing any missing city information. The enrichment may also be based on historical data where the data 104 (or the sample 106) may be compared to previously obtained samples, and based on a match, enriched in a similar manner as the previously obtained sample. The historical data may also be enriched based on a sample of the data 104 that has not previously been encountered. The enrichment may also be based on mathematical manipulations where the data 104 (or the sample 106) may be compared to previously obtained samples, and based on a match, the data 104 may be mathematical manipulated (e.g., performance of averaging on time series data, etc.).

At location #3, the data transformer 110 may determine features 112 of the enriched sample of the ascertained data 104. A feature may be described as an attribute that describes information in the data 104. For example, a location attribute may be described as a feature of data that includes global positioning system (GPS) numbers. Further, the data transformer 110 may determine, based on the features 112 of the enriched sample of the ascertained data 104, the at least one transformation 114 to be applied to the enriched sample of the ascertained data 104 to transform the enriched sample of the ascertained data 104 from a first format to a second format. The data transformer 110 may further determine user/target roles and behaviors with respect to the data 104, and implement enrichment of the data set features, and user/target roles and behaviors. The user may be described as a person or entity that is currently using or is otherwise associated with the ascertained data 104. The target may be described as a person or entity that is to use or is otherwise associated with the transformed data 124. Further, the data transformer 110 may learn of any operations performed (i.e., data enrichment with anomalous behavior scores). For example, for the security log traces, the data transformer 110 may learn of any operations performed as: Highly_Anomalous, 1, 0.00014]...[114.135.67.66,,,,583064f457f9de5-4307835f738ab09c671e596dd5db6b40b0d3a9e102e256-bee,3ZUB5Zj8BABCAA7H4FDTC+Q==,,,20 Feb 2014 22:59:09 EST,Low,US/Eastern,-18000000,,,,,,,,super-agent_ng,5.2.5.6403.0, etc. The "Highly_Anomalous" may represent an enrichment performed on the data, indicating that the data is highly anomalous.

At location #4, the data transformer 110 may learn typical behaviors, and enrich learned behaviors. For example, the data transformer 110 may learn typical behaviors such as whether a user performs a merge, an enrich, a split, etc., on the data 104. In this regard, from previous learned behavior, data set features/type, and role of a user, the data transformer 110 may recommend the at least one transformation 114. For example, assuming that a user performs a merge on certain columns of the data 104 after performing a split on other related columns, this previous learned behavior may be used by the data transformer 110 to recommend the transformation 114 that includes a merge once a user performs a split on certain columns of the data 104. In this regard, the previous learned behaviors may be used to generate a learned model of behaviors and associated transformations.

At location #5, the data transformer 110 may map behaviors against the learned model, suggest results, provide guidance (e.g., guided automated/algorithmic intuition), and obtain feedback. In this regard, the data transformer 110 may produce the at least one transformation 114, which may be selected by a user. With respect to the aspect of providing guidance, the data transformer 110 may recommend, based on an analysis of the learned model, for example, that a split is not to be performed on the data 104 after the performance of a merge.

At location #6, the results generator 122 may publish, document, and codify workflow.

Figure 3:
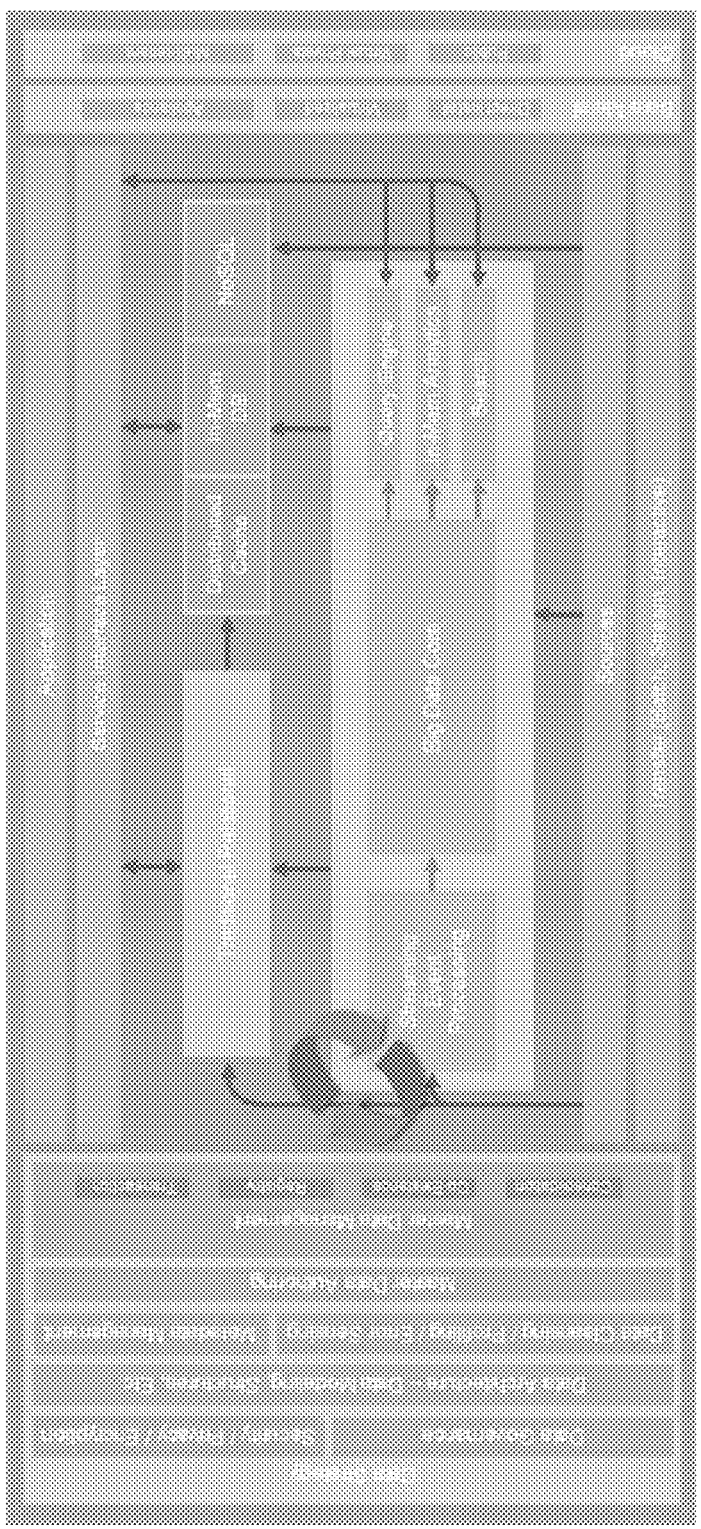
FIG. 3 illustrates a large data stack for the intelligent data munging system of FIG. 1, illustrating areas where intelligent munging components may reside and the immediate interactions within a large data environment, according to an example of the present disclosure.

FIG. 3 illustrates a large data stack for the system 100, illustrating areas where intelligent munging components may reside and the immediate interactions within a large data environment, according to an example of the present disclosure.

With respect to data munging, the system 100 may provide for the reduction of efforts spent on data transformation, creation of rules to transform data, profiling of data with descriptive statistics over accurate representation of data, and precise and accurate communication of a data profile with expressive, succinct, and targeted information. Referring to FIG. 3, the highlighted sections indicate where intelligent munging components reside and the immediate interactions within the large data environment.

Figure 4:
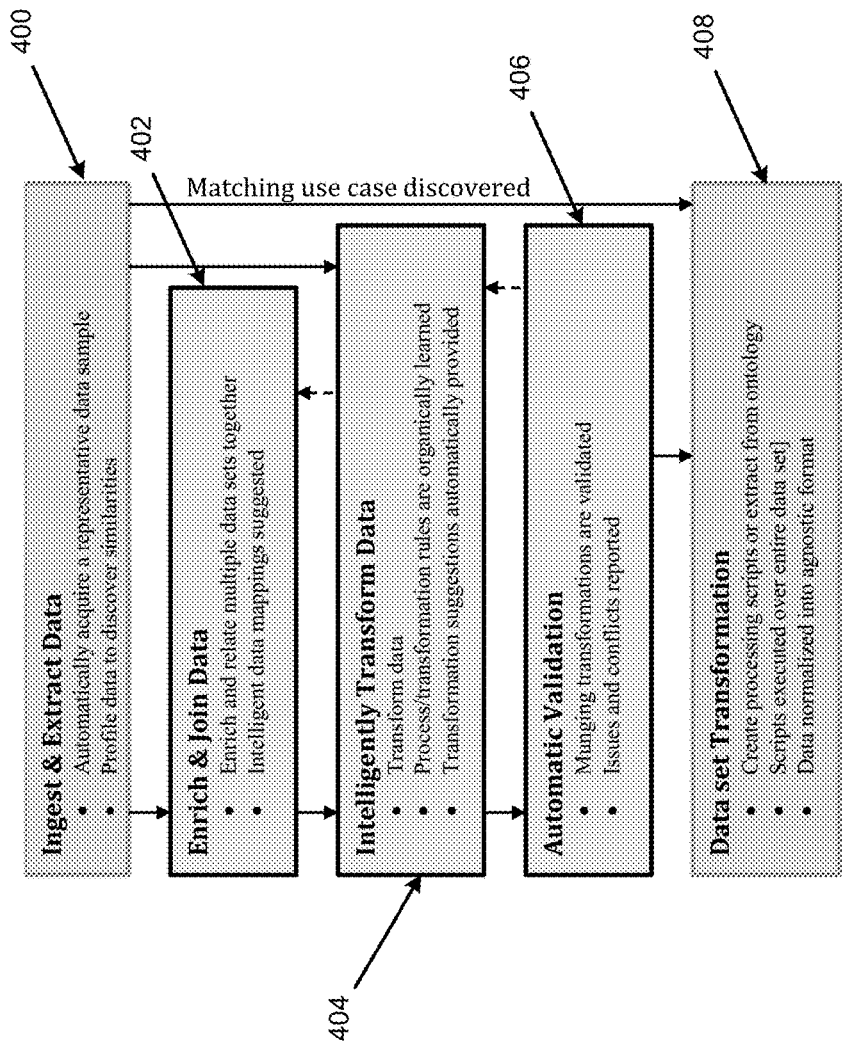
FIG. 4 illustrates an intelligent data munging workflow for the intelligent data munging system of FIG. 1, according to an example of the present disclosure.

FIG. 4 illustrates an intelligent data munging workflow for the system 100, according to an example of the present disclosure. FIG. 4 illustrates the five components of an intelligent data munging workflow, illustrating a machine learning-assisted, collaborative way of placing the data 104 into a specified format.

Referring to FIG. 4, at block 400, the intelligent data munging workflow process begins with sampling the target data sets (i.e., the data 104), for example, by using the data loader 102, to ascertain a sample 106 of the data 104. In order to obtain a representative understanding of very large data sets, it may be inefficient to review every row. A user may be able to adjust the sampling methodology for the user's purposes, but the data loader 102 may ensure a representative sample is drawn. Sampling by the data loader 102 may be dynamic and configurable.

At block 400, based on the sample 106 of the data 104, the data loader 102 may further determine whether the same or similar data sets have been ascertained before. For example, the data loader 102 may determine whether a type and/or structure of the data 104 has been ascertained before. If the same or similar data sets have been ascertained before, the intelligent data munging workflow process may proceed directly to the fifth stage at block 408, and execute (e.g., by the results generator 122) the data set transformation (at the user's discretion).

At block 402 that represents the second stage of the intelligent data munging workflow process, for the second stage where intelligence speeds the process to delivery, the data iterator 108 may enrich and join multiple data sets. For example, the data 104 may be incomplete. The data iterator 108 may complete the data 104 either through additional data, and/or based on mathematical and statistical manipulations.

At block 402, the data iterator 108 may perform removal of unnecessary artifacts. For example, the data 104 may include noise. If the data 104 includes noise, a plurality of sets of the data 104 (e.g., parts of the data 104, or different sets of the data 104) may be needed to ascertain meaningful information. For example, assuming that the data 104 includes a state and a city, separated by a comma, a transformation may include removal of the comma, and separation of the state and city information. The state information may be discovered, for example, based on an analysis of patterns of state abbreviations.

At block 402, the data iterator 108 may further generate recommendations of intelligent data mappings, such as by identifying that each loaded data set includes either state names or state abbreviations, where tables may be joined on these variables.

At block 404 that represents the third stage of the intelligent data munging workflow process, for the third stage, the data transformer 110 may learn sector or domain-specific transformations (e.g., transformations for time series data, etc.) over time. For example, the data transformer 110 may learn transformations using Artificial Intelligence (AI) and historical data wrangling actions. For example, the data transformer 110 may learn transformations based on how certain types of transformations are applied to historical data. In this regard, the data transformer 110 may use features of individual sets of the data 104 with Artificial Intelligence driven algorithms to predict the ideal transformation 114 or set of transformations tailored for the data 104.

For example, a global firm's inventory management system may use identification variables of the form US27475, where "US2" means the mid-Atlantic region of the United States. When a user has made this transformation once, the data transformer 110 may generate a recommendation creating a variable that includes the human-readable region name by identifying data in the original format. Additionally, the data transformer 110 may intelligently discover syntactic and semantic structures such as geo-locations, phone numbers, and other data types.

At block 406 that represents the fourth stage of the intelligent data munging workflow process, after the user has reviewed recommended transformations and added any further transformations, the data munging validator 116 may validate these transformations and report issues and conflicts back to the user. For example, once the transformations (e.g., the transformation 114, and other such transformations) are specified, the transformations may be validated by the data munging validator 116. According to an example, the data munging validator 116 may validate the transformations by using historical data.

The data munging validator 116 may also analyze the transformed data for any conflicting results, and record the conflicts. In this regard, a user of the system 100 may be prompted to approve a particular transformation.

Upon completion of the data munging, the original data 104 may be preserved and the transformations may be pushed to a full big data cluster where they are executed and a new data set is created.

The data munging may be performed in an iterative manner. In this regard, the results generator 122 may generate displays that show the users the story of the data visually with side-by-side, "before and after" comparisons. The results generator 122 may create a mutable history that may be shared with users who may provide feedback and make transformations of their own. This history may then be saved and applied to future data sets, reducing the time it takes to perform the same function. Working with the data after it has been prepared may be facilitated by export to open file formats (e.g., CSV, XML, JSON), or the user may be provided with the option to export a file specialized for specific visualization tools. Moreover, data stored in Hadoop™ may be integrated with visualization tools using Hive™ or other solutions.

At block 408 that represents the fifth stage of the intelligent data munging workflow process, with respect to data set transformation, the script generator 118 may create processing scripts or extract processing scripts from an ontology, scripts may be executed over the entire set of the data 104, and the data 104 may be normalized into an agnostic format. With respect to the ontology, relevant parts of a script may be retrieved from the ontology and combined to form a script. Thus, the script generator 118 may convert the results generated at block 406 into scripts (e.g., the script 120, and other such scripts), and execute the scripts on the data 104.

Figure 5:
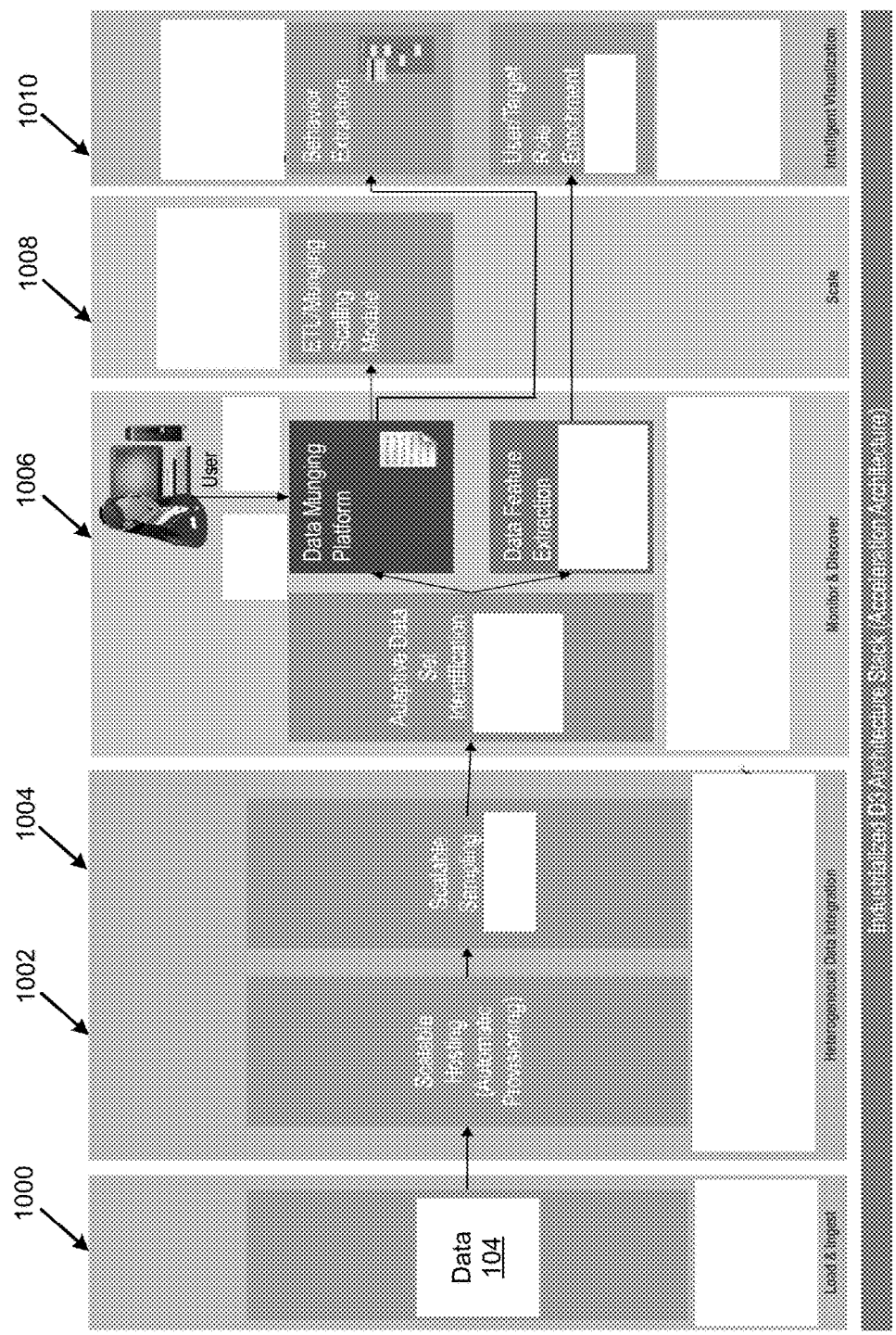
FIG. 5 illustrates an industrialized architecture stack (acceleration architecture) for the intelligent data munging system of FIG. 1, according to an example of the present disclosure.

FIG. 5 illustrates an industrialized architecture stack (i.e., a data acceleration architecture) for the system 100, according to an example of the present disclosure. With respect to data acceleration, the system, method, and non-transitory computer readable medium disclosed herein facilitate the movement of the data 104 swiftly from its source to places in an organization where the data 104 is needed, processing of the data 104 to gain actionable insights as quickly possible, and the fostering of interactivity based on faster responses to queries submitted by users or applications. At location 1000, the data loader 102 may ascertain the data 104 that is to be transformed. At location 1002, the data 104 may be received for scalable hosting. At location 1004, the data loader 102 may determine, based on an analysis of the ascertained data 104, the sample 106 of the ascertained data 104. At location 1006, the data iterator 108 may enrich the sample 106 of the ascertained data 104. Further, at location 1006, the data transformer 110 may determine features 112 of the enriched sample of the ascertained data 104. The data transformer 110 may also determine, based on the features 112 of the enriched sample of the ascertained data 104, the at least one transformation 114 to be applied to the enriched sample of the ascertained data 104 to transform the enriched sample of the ascertained data 104 from a first format to a second format. At location 1008, the results generator 122 may generate, based on the validation of the determined transformation 114, the display including the ascertained data 104 and transformed data 124 that is generated based on application of the script 120 to the ascertained data 104. At location 1010, various other operations such as behavior extraction and user/target role enrichment may be performed by the data transformer 110.

FIG. 6 illustrates a data sample for the system 100, according to an example of the present disclosure.

Referring to FIG. 6, the data iterator 108 may enrich the sample 106 of the ascertained data 104. In this regard, the data iterator 108 may identify missing parts of the sample of the ascertained data 104, and complete the missing parts of the sample of the ascertained data 104 based on historical data, and/or mathematical manipulations associated with the sample of the ascertained data 104. For example, the data iterator 108 may complete the missing information with respect to the state based on the zip code from historical data.

With respect to FIG. 6, the data transformer 110 may intelligently discover syntactic and semantic structures such as geo-locations, phone numbers, and other data types for the ascertained data 104. For example, with respect to the "Address_1:num, text" designation, the data transformer 110 may determine that the address column includes numerical and text information.

Figure 7:
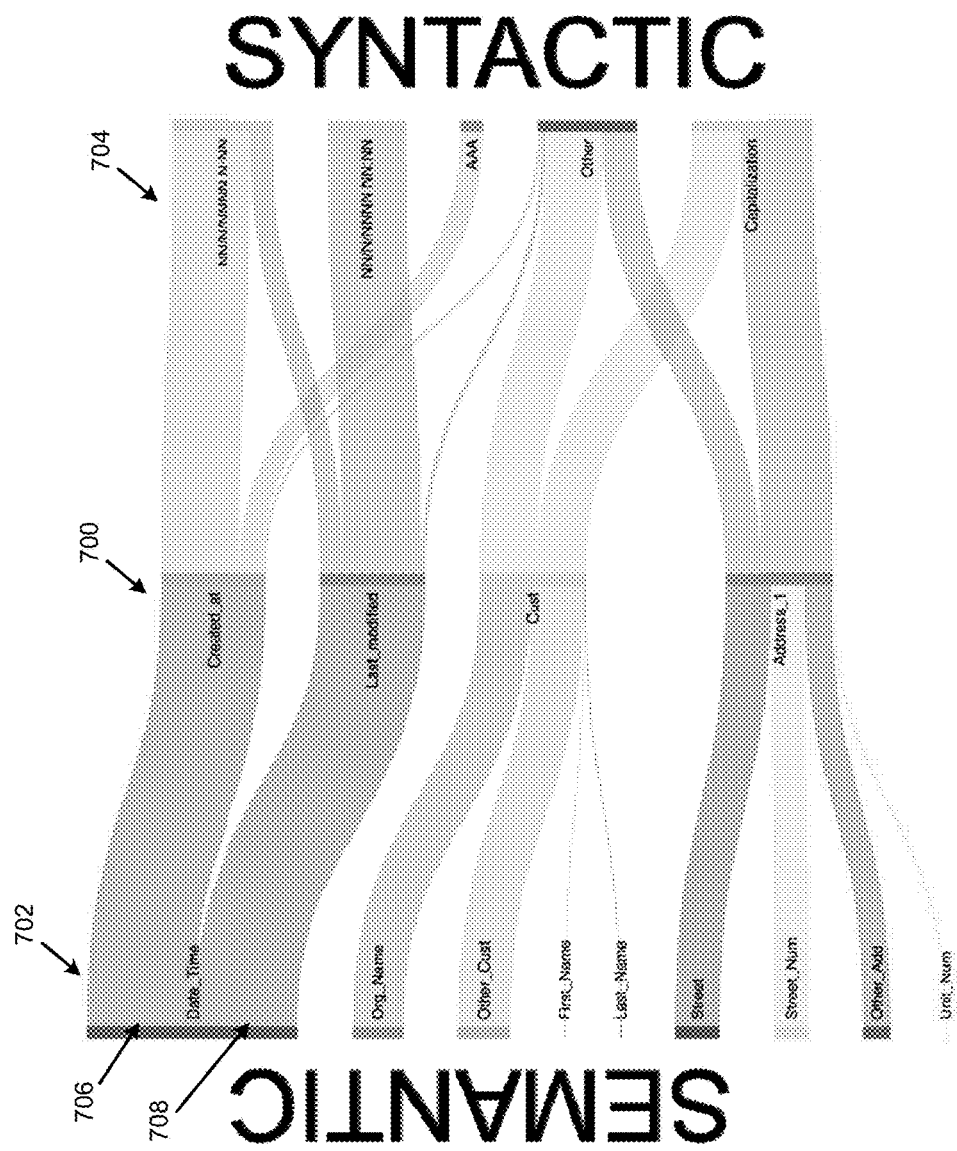
FIG. 7 illustrates classifications for the intelligent data munging system of FIG. 1, according to an example of the present disclosure.

FIG. 7 illustrates classifications for the system 100, according to an example of the present disclosure. The classifications may be used for feature extraction. For example, as disclosed herein with respect to FIGS. 9A and 9B, the data transformer 110 may determine features of the enriched sample of the ascertained data 104 by determining, based on a semantic analysis of the enriched sample of the ascertained data 104, a semantic profile of the enriched sample of the ascertained data 104. Further, the data transformer 110 may determine, based on a syntactic analysis of the enriched sample of the ascertained data, a syntactic profile of the enriched sample of the ascertained data. The data transformer 110 may determine, based on the semantic profile and the syntactic profile of the enriched sample of the ascertained data, the features of the enriched sample of the ascertained data. For example, for the data at 700, the semantic profile is illustrated at 702, and the syntactic profile is illustrated at 704. Features associated with the semantic profile at 702 include, for example, "Date_Time", Org_Name", etc., and features associated with the syntactic profile at 704 include, for example, "NN/N/NNNN N:NN", "NN/N/NNNN NN:NN", etc. Based on the determination of the semantic profile and the syntactic profile, the results generator 122 may generate a display including the ascertained data 104 and transformed data 124, where the transformed data 124 includes, for example, identification of the features 112 associated with the ascertained data 104. For example, assuming that the features 112 of the ascertained data 104 include the "Date_Time" (i.e., the features of the semantic profile 702), in order to transform the data 104 to extract time information related to "hours", the features associated with the syntactic profile at 704 that include "NN/N/NNNN N:NN" and "NN/N/NNNN NN:NN" may be used to respectively extract the time information from the mapped "Date_Time" at 706 and 708, as "N:NN" and "NN:NN". Thus, a first transformation may be applied to the "Date_Time" data at 706, and a second transformation may be applied to the "Date_Time" data at 708. Further, the extracted time information in the form of "N:NN" and "NN:NN" may be normalized so that the extracted time information is displayed or otherwise analyzed in the form of "NN:NN".

FIG. 8 illustrates data profiling for the system 100, according to an example of the present disclosure.

Referring to FIG. 8, the data loader 102 may determine, based on an analysis of the ascertained data 104, the sample 106 of the ascertained data 104. The sample 106 of the ascertained data 104 may be less than the ascertained data 104. For example, as shown in FIG. 8, the sample 106 that represents the addresses may be less than the ascertained data 104 which includes a plurality of additional addresses. Further, the sample 106 may represent a random sample of the data 104.

Figure 9A:
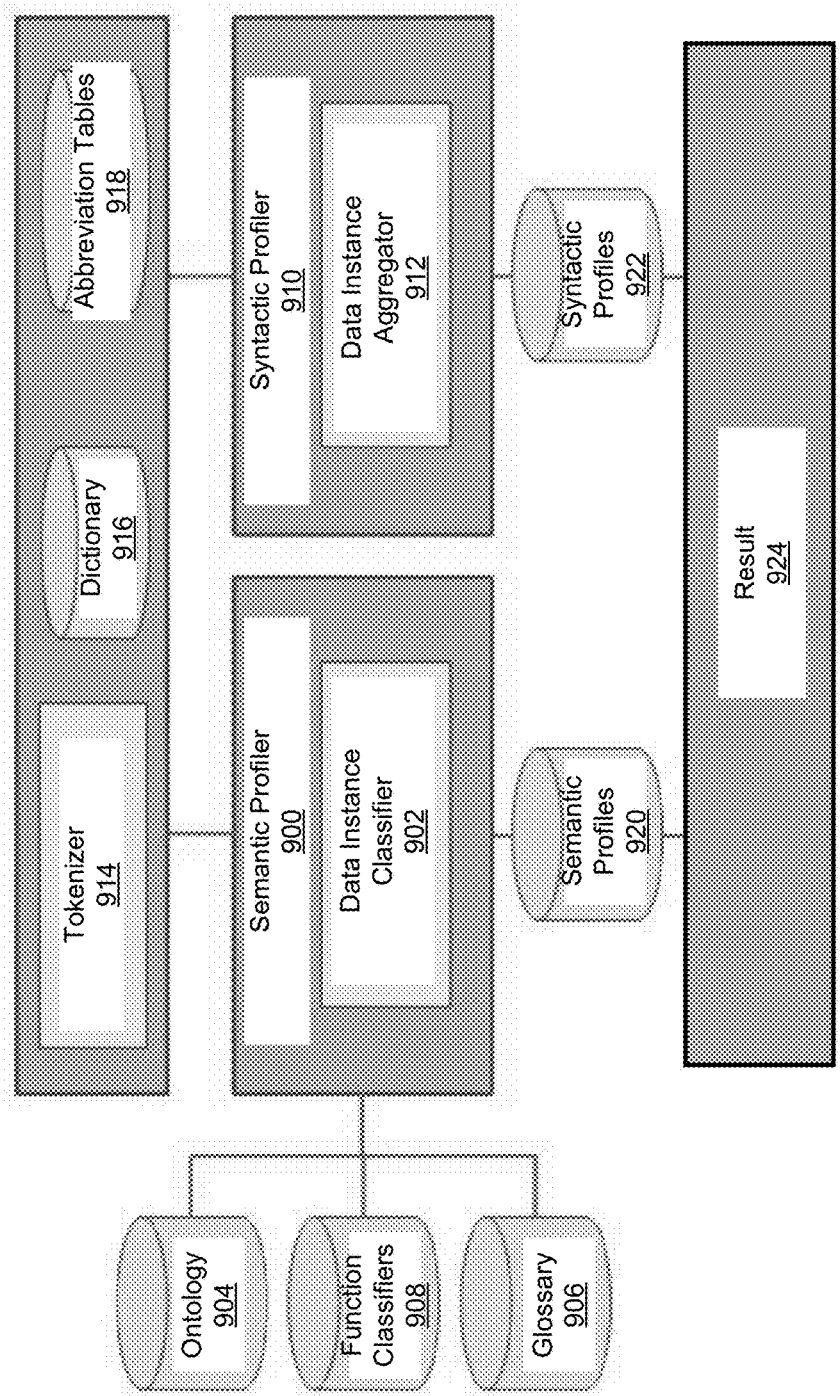
FIG. 9A illustrates data profiling for the intelligent data munging system of FIG. 1, according to an example of the present disclosure.
Figure 9B:
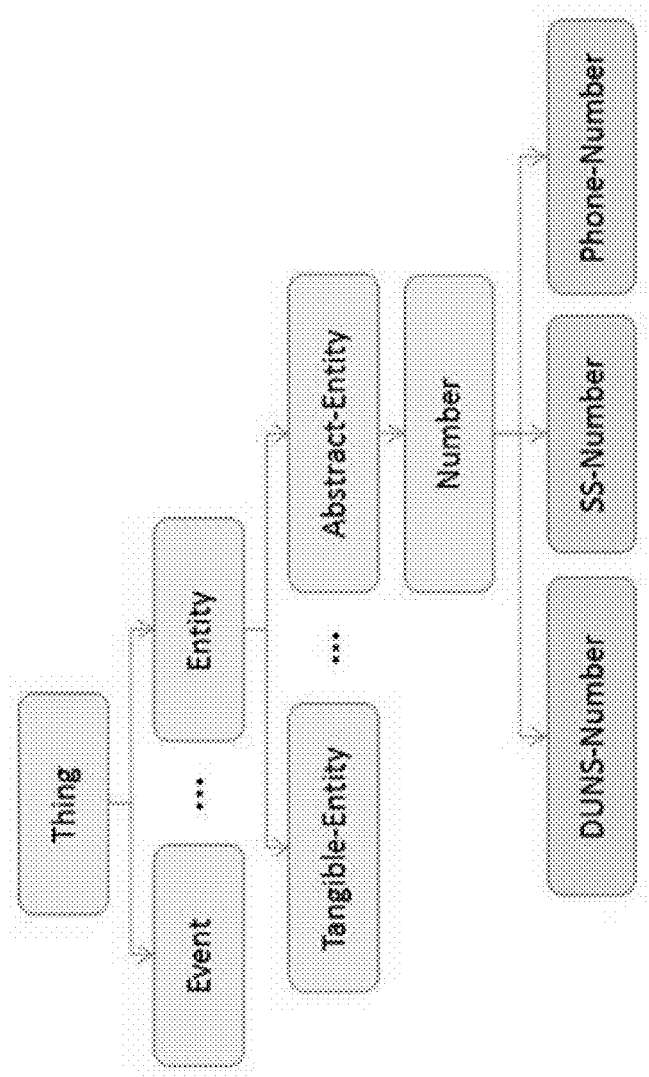
FIG. 9B illustrates a framework associated with data profiling for the intelligent data munging system of FIG. 1, according to an example of the present disclosure.

FIG. 9A illustrates data profiling for the system 100, according to an example of the present disclosure. FIG. 9B illustrates a framework associated with data profiling for the system 100, according to an example of the present disclosure.

Referring to FIG. 9A, the semantic profiler 900 may include a data instance classifier 902 that uses an ontology 904, a glossary 906, and function classifiers 908 to generate a class vector representation of the data 104. A vector may generally refer to a mathematical representation of text by an array of numbers. The semantic profiler 900 may use class vectors, where a class refers to the concepts in semantic modeling. A concept has a given class name, and may include a superclass. In addition, a concept may include a list of component classes which represent an attribute mapping that lists concept keywords for the class.

The ontology 904 may provide for the determination of hierarchal relationships between different components of the data 104 (e.g., hierarchal relationships between a street number, a street name, a state, and a city, where an address may include a street number, followed by a street name, followed by a city, and then followed by a state, etc.). The ontology 904 may include the different concepts embedded therein. For example the ontology 904 may include the concepts, street number, unit number, apartment number with a superclass of address. When data is first received, the data is first assigned a class name of address and then other subclasses.

With respect to the glossary 906, a user may extend the classifiers that are supported by using a user interface to define new ontology classes in the glossary, and providing keywords or text patterns that may be used for classification to the created class. The glossary 906 may support the addition of new concepts.

A syntactic profiler 910 may include a data instance aggregator 912 that creates an instance vector to represent the data 104. The semantic profiler 900 may return general concepts, and the syntactic profiler 910 may return patterns associated with the concepts. The syntactic profiler 910 may use an instance vector, where an instance implies patterns (e.g., the two types of patterns for data-time in FIG. 7). To produce a data instance vector for an attribute, the data instance aggregator 912 may first take a data instance and determine its occurrence in the instance vector. If the data instance already exists, a count associated with the data instance may be incremented, and otherwise, the data instance may be added with an initial count value of one. A textual pattern describing the data instance may also be generated. The general concepts may be described as high level attributes that describe the features 112 (e.g., financial information, address information, etc.). The patterns may be described as the structure of the high level attributes (e.g., xxxx-xxxx-xxxx-xxxx for credit card information, nn/nn/nnnn for date information, etc.).

As shown in FIG. 9B, the framework associated with data profiling shows the top level concepts such as Thing, Event, and Entity, and also shows concrete built-in classes such as DUNS-Number, SS-Number and Phone-Number.

A concept may include a given class name, and may include a superclass. In addition, a concept may include a list of component classes, an attribute mapping that lists concept keywords for the class, and an instance mapping function that is applied to data instances to check if a value should be classified as this class. Classification type that is supported includes, for example, keyword and pattern based classification.

Glossary based classifiers may use a historically harvested data to generate the classifier, and the functional classifier may algorithmically differentiate between different classes. All these classifiers may be combined to produce the results. The glossary based classifiers may be provided by a user (e.g., a user may indicate the availability of a new concept). For example, at the first encounter of the data 104 including pharma data, a user may specify drug-names as a new concept. Function classifiers may represent the mathematical algorithm used for the classification. For example, instead of logistic regression, a user may use support vector machines for classification.

Referring again to FIG. 9A, the semantic profiler 900 and the syntactic profiler 910 may use text mining techniques such as a tokenizer 914, dictionary 916, and abbreviation resolver (i.e., abbreviation tables 918) to normalize and enrich data instances during profiling. The tokenizer 914 may divide the ascertained data 104 into tokens. The dictionary 916 may be referred to for comprehension of the tokens. The tokenizer 914, the dictionary 916, and the abbreviation tables 918 may be used the analyze the input data 104. The results of the analysis may be combined with the ontology 904, the glossary 906, and the function classifiers 908 to generate the class vectors (for semantic profiling) and the instance vector (for syntactic profiling). With respect to normalization, normalization may represent the process of mapping different structures of data that mean the same entity (e.g., 'Chicago', 'chicago' are mapped to the same entity). Tokenization may refer to the correct type of separation for the given data. For example, for zip code, city, country, the data 104 may not be divided. However for date-time, the data 104 may be divided on space and ":" to separate date and time, and also hour and minutes. Further the dictionary may refer to already existing information (e.g., {United States: Country, United States of America, etc.}. These aspects may be used to normalize and also add further information about the data 104.

With respect to the semantic profiler 900, a large number of ontology classes and user inputs may include a large number of tables and attributes. Before classifying the data instances of an attribute, the data instance classifier 902 may narrow down the class candidates to use for classification by taking advantage of the naming conventions disclosed herein. With respect to naming convention, when a database attribute is assigned a shortened name, for multi-word terms, the words may be combined using camel case, the words may be combined and the first word may be shortened to its first letter, or a few letters, vowels, or syllables may be removed. For example last name becomes LName and postal code becomes postcode, etc.

The data instance classifier 902 may tokenize the attribute name. Further, the data instance classifier 902 may perform a lookup of the dictionary 916 to decode each of the tokens. The data instance classifier 902 may perform an abbreviation resolution on the tokens, producing a list of concept words used in naming the attribute. These concept words may be used to query for classes with matching attribute mappings property, resulting in a list of initial class candidates. This initial list may be trimmed by removing any subsumed superclasses, and then expanded by adding subclasses. Finally, if there are classes with component classes, these component classes may be added to the list, to form a final list of classification candidates. For example, assuming that an identified data class belongs to address, this may represent the initial class. Next, the address may be identified as comprising of street number, unit number, apt number, etc. While reporting, address is not reported, instead street number, unit number, apt number, etc., may be reported to minimize confusion.

With respect to the syntactic profiler 910, the same type of textual normalization and enrichment applied to the data instance during semantic profiling may be performed during syntactic profiling. The data instance may be tokenized, with the tokens being decoded with a lookup of the dictionary, and the abbreviations being resolved to produce value words. The data instance aggregator 912 may update the count for each value words in the instance vector. For example, as each row of the data is received, its pattern may be identified and the instance vector with the right pattern may be updated by adding one. The next data instance may then be profiled. Once all of the data instances are profiled, the result may represent the instance vector of the attribute.

The semantic profiles 920 and the syntactic profiles 922 may be used to generate the result 924 which include an identification of the features 112 of the sample 106. That is, the semantic profiles 920 and the syntactic profiles 922 may represent the features (i.e., the results of intelligent data munging) that are used, for example, in intelligent visualization. For example, the semantic profiler 900 may return general concepts, and the syntactic profiler 910 may return patterns associated with the concepts. The general concepts may be described as high level attributes that describe the features 112 (e.g., financial information, address information, etc.). The patterns may be described as the structure of the high level attributes (e.g., xxxx-xxxx-xxxx-xxxx for credit card information, nn/nn/nnnn for date information, etc.). In this regard, the general concepts may be mapped to the patterns to generate the results 924 that include an identification of the features 112 of the sample 106 (e.g., whether the feature is an address based on a match of address information with an address pattern, etc.).

Figure 10:
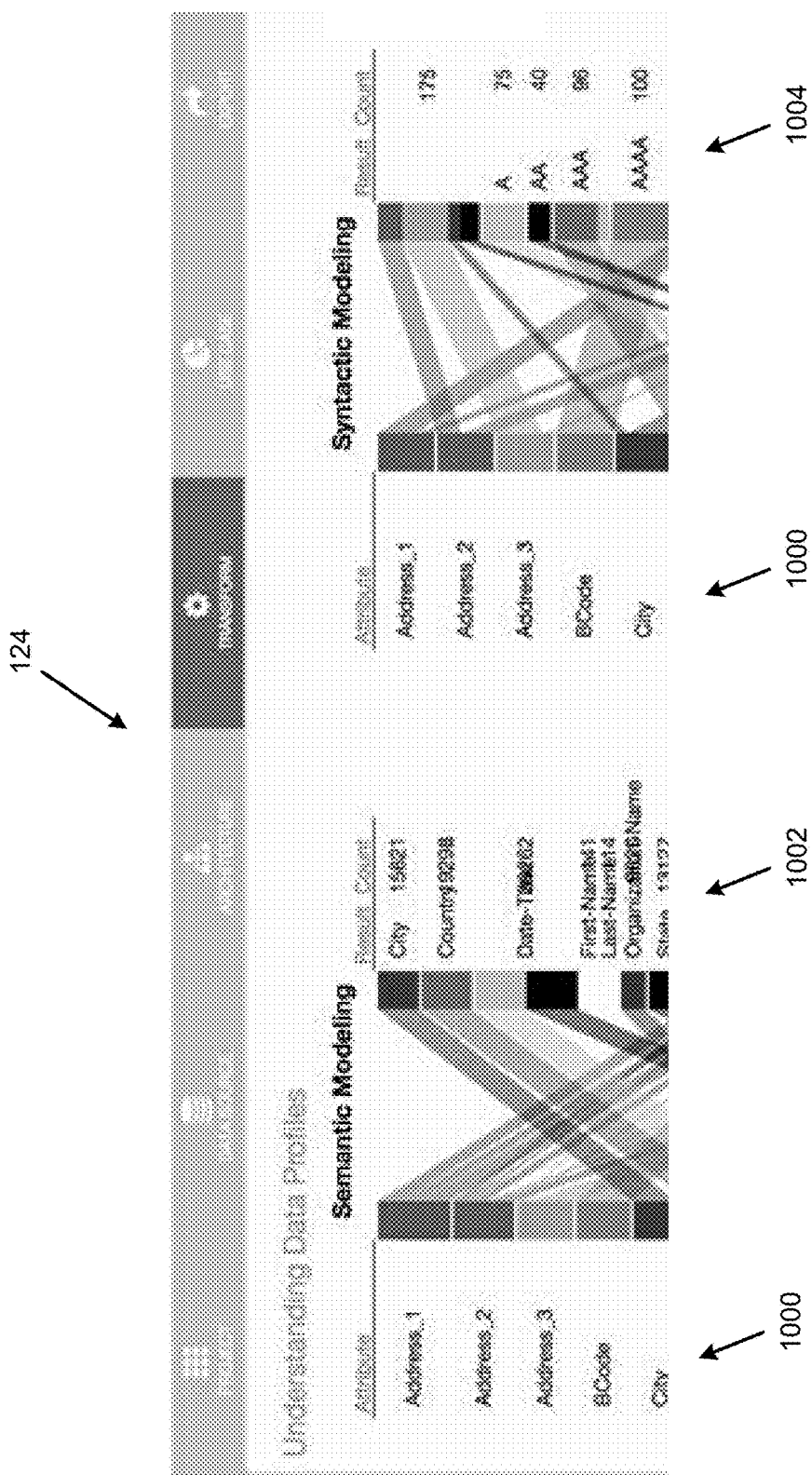
FIG. 10 illustrates semantic modeling and syntactic modeling for transformations for the intelligent data munging system of FIG. 1, according to an example of the present disclosure.

FIG. 10 illustrates semantic modeling and syntactic modeling for transformations for the system 100, according to an example of the present disclosure.

Referring to FIG. 10, with respect to semantic modeling, the transformed data 124 may include attributes at 1000 mapped to concepts at 1002. Further, with respect to semantic modeling, attributes at 1000 may be mapped to patterns at 1004. In this regard, the transformed data 124 may be displayed as shown in FIG. 10 to include the semantic and syntactic mapping.

Referring again to FIG. 1, the data anomaly analyzer 130 may access the data 104 that is to be analyzed for an anomaly. The data anomaly analyzer 130 may determine, based on the transformed data 124, whether the data 104 includes the anomaly. That is, absent the transformation of the data 104, the anomaly may not otherwise be detectable. For example, the data 104 may be transformed to extract time series information from the data. For example, as illustrated in FIG. 7, the data 104 may be transformed to extract hour and minute information in the form of "N:NN" and "NN:NN". The time series information may be analyzed by the data anomaly analyzer 130 to detect an anomaly (e.g., where an anomaly represents a number of events in a predetermined time interval that exceeds a threshold, absence of a continuous set of events within a predetermined time interval, etc.). In this regard, absent the transformation of the data 104 to the transformed data 124, such anomaly information may not otherwise be detectable. In response to a determination that the data 104 includes the anomaly, the device controller 126 may control the device 128 associated with the data 104. Alternatively or additionally, a firewall associated with the data 104 and/or the device 128 may be controlled to place a network in a secure mode.

Figure 11:
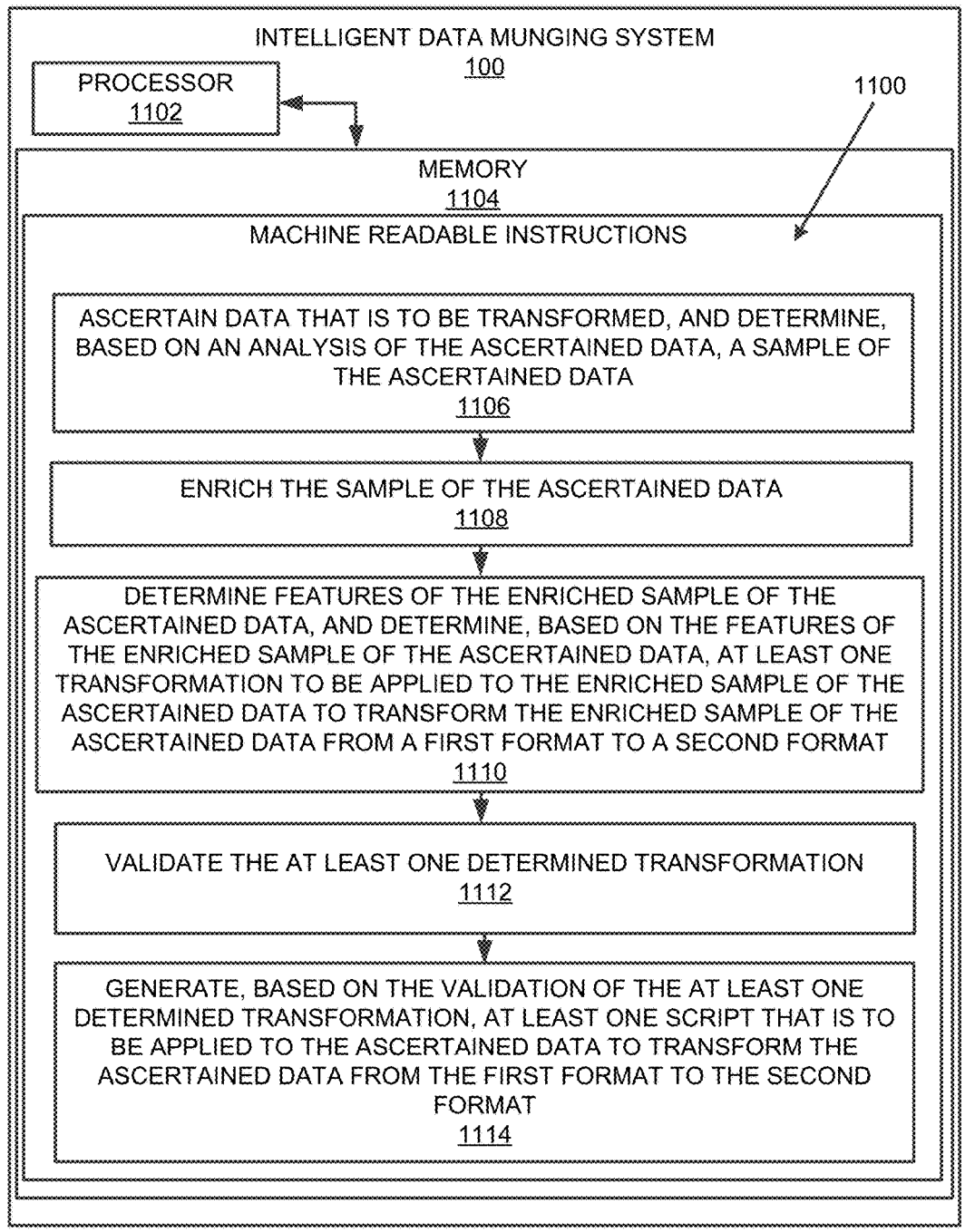
FIG. 11 illustrates a flowchart of a method for intelligent data munging, according to an example of the present disclosure.
Figure 12:
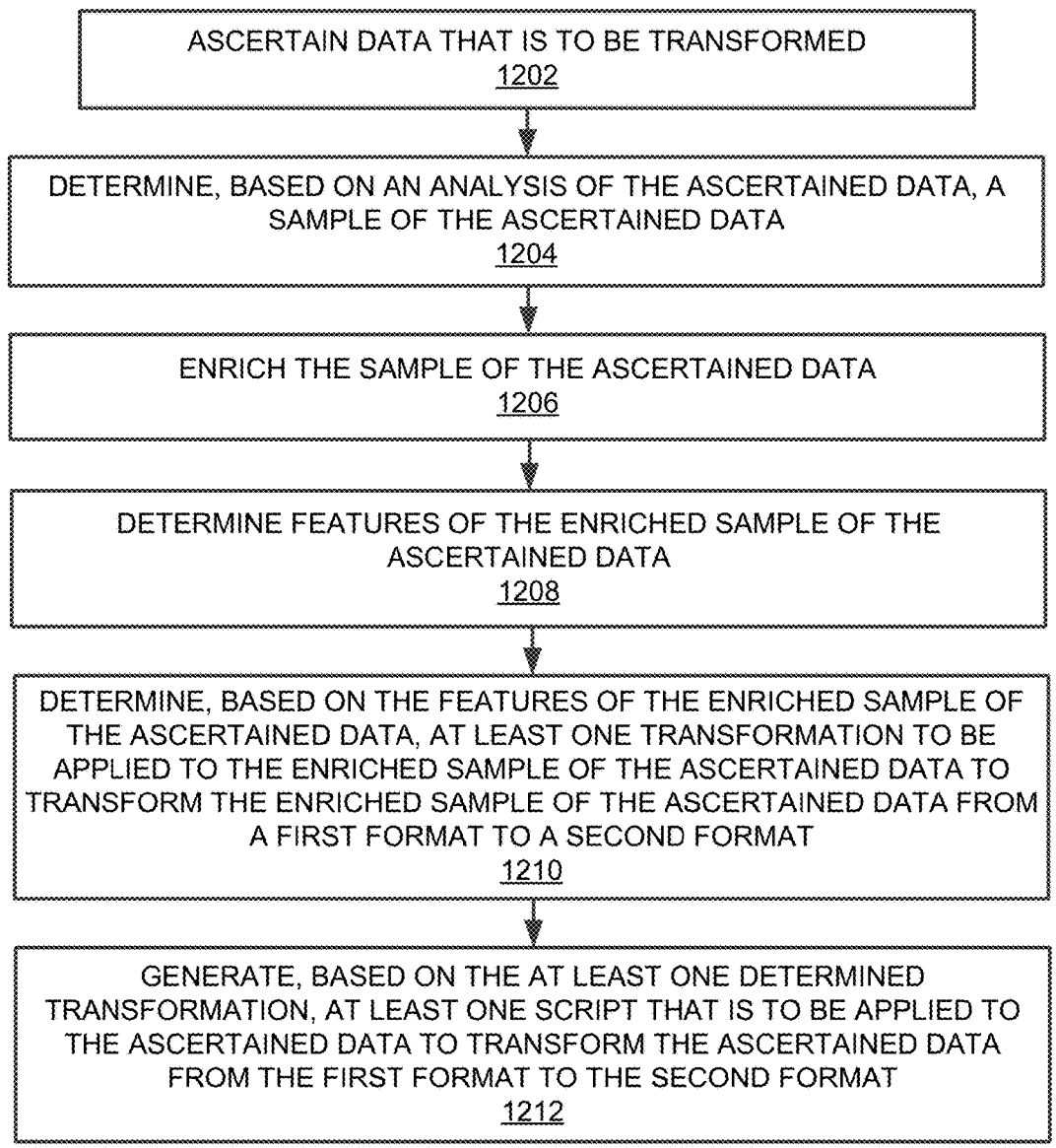
FIG. 12 illustrates a flowchart of another method for intelligent data munging, according to an example of the present disclosure.
Figure 13:
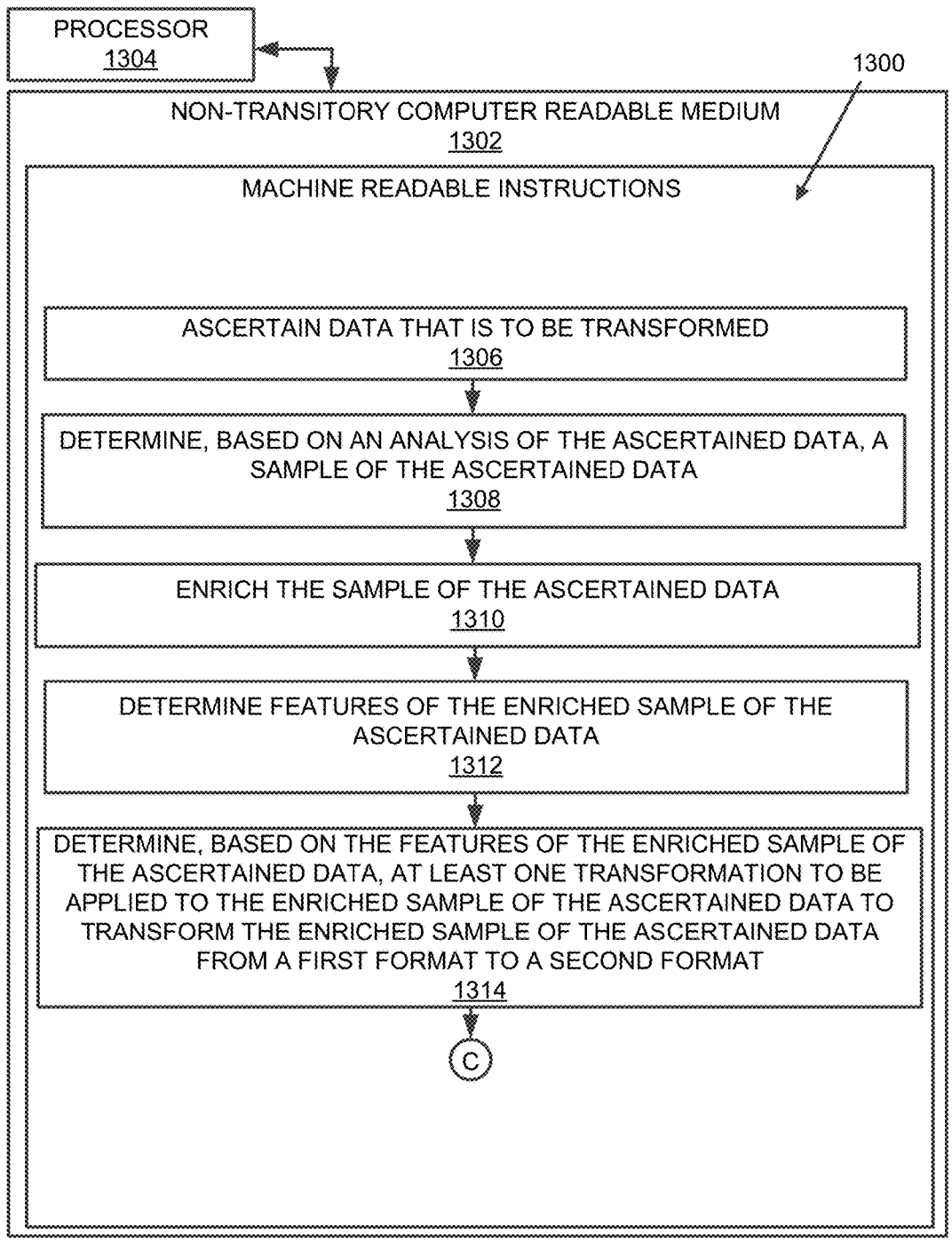
FIG. 13 illustrates a flowchart of a further method for intelligent data munging, according to an example of the present disclosure.
Figure 13:
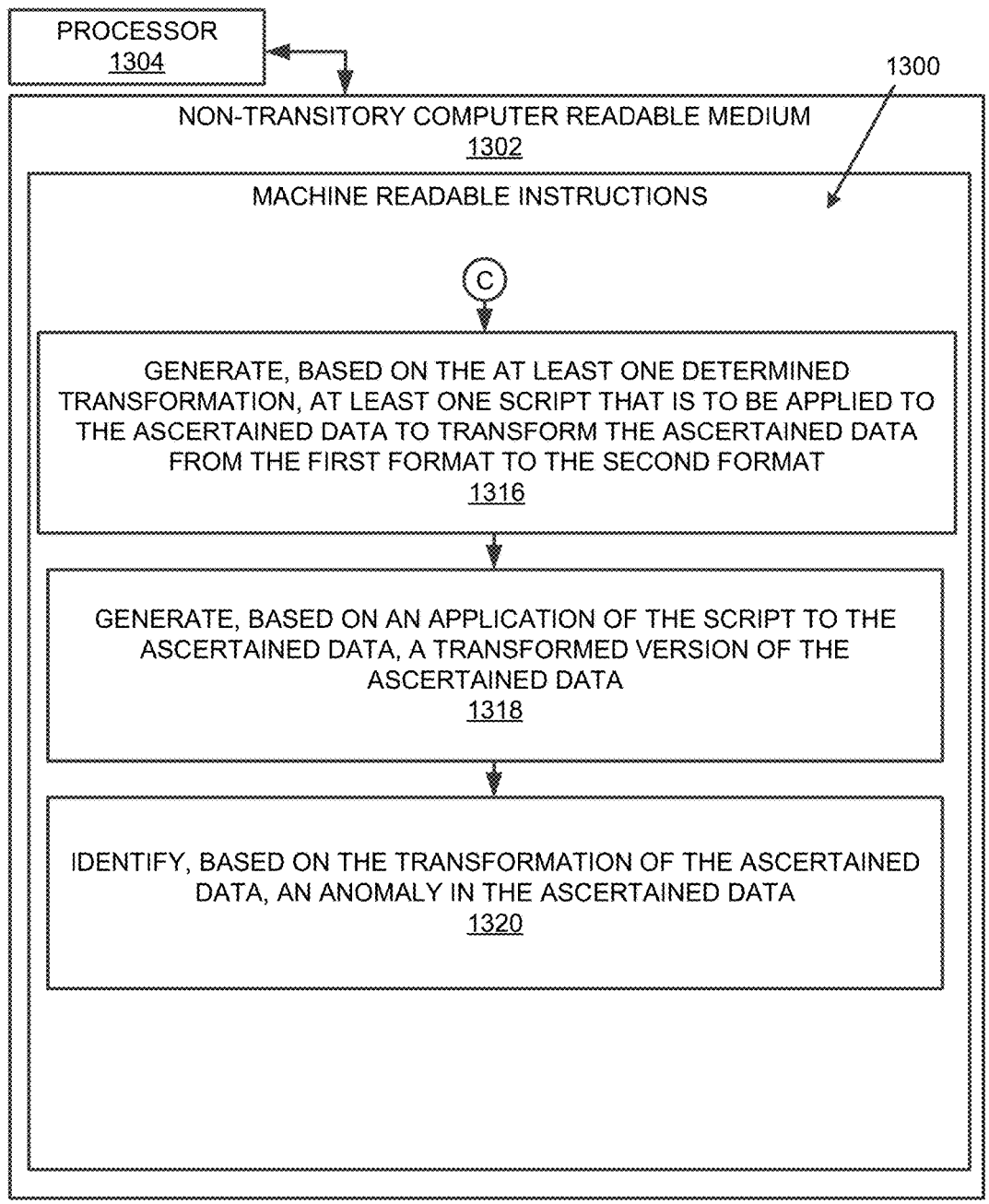

FIGS. 11-13 respectively illustrate flowcharts of methods 1100, 1200, and 1300 for intelligent data munging, according to examples. The methods 1100, 1200, and 1300 may be implemented on the system 100 described above with reference to FIGS. 1-15 by way of example and not limitation. The methods 1100, 1200, and 1300 may be practiced in other system. In addition to showing the method 1100, FIG. 11 shows hardware of the system 100 that may execute the method 1100. The hardware may include a processor 1102, and a memory 1104 storing machine readable instructions that when executed by the processor cause the processor to perform the steps of the method 1100. The memory 1104 may represent a non-transitory computer readable medium. FIG. 12 may represent a method for intelligent data munging, and the steps of the method. FIG. 13 may represent a non-transitory computer readable medium 1302 having stored thereon machine readable instructions to provide intelligent data munging. The machine readable instructions, when executed, cause a processor 1304 to perform steps of the method 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the method 1100 shown in FIG. 11, at block 1106, the method 1100 may include ascertaining (e.g., by the data loader 102) data 104 that is to be transformed, and determining, based on an analysis of the ascertained data 104, a sample 106 of the ascertained data 104. The sample 106 of the ascertained data 104 may be less than the ascertained data 104.

At block 1108, the method 1100 may include enriching (e.g., by the data iterator 108) the sample 106 of the ascertained data 104.

At block 1110, the method 1100 may include determining (e.g., by the data transformer 110) features 112 of the enriched sample 106 of the ascertained data 104, and determining, based on the features 112 of the enriched sample 106 of the ascertained data 104, at least one transformation 114 to be applied to the enriched sample 106 of the ascertained data 104 to transform the enriched sample 106 of the ascertained data 104 from a first format to a second format. The at least one transformation 114 may be determined from a plurality of available transformations.

At block 1112, the method 1100 may include validating (e.g., by the data munging validator 116) the at least one determined transformation 114.

At block 1114, the method 1100 may include generating (e.g., by the script generator 118), based on the validation of the at least one determined transformation 114, at least one script 120 that may be applied to the ascertained data 104 to transform the ascertained data 104 from the first format to the second format.

According to examples, the method 1100 may further include generating (e.g., by the results generator 122) a display including the ascertained data 104 and transformed data 124 that is generated based on application of the at least one script 120 to the ascertained data 104.

According to examples, for the method 1100, determining (e.g., by the data transformer 110), based on the features 112 of the enriched sample 106 of the ascertained data 104, the at least one transformation 114 to be applied to the enriched sample 106 of the ascertained data 104 to transform the enriched sample 106 of the ascertained data 104 from the first format to the second format may further include learning, based on previously determined features that are similar to the features 112 of the enriched sample 106 of the ascertained data 104, the at least one transformation 114. Further, the method 1100 may include determining, from the learning of the at least one transformation 114, the at least one transformation 114 to be applied to the enriched sample 106 of the ascertained data 104 to transform the enriched sample 106 of the ascertained data 104 from the first format to the second format.

According to examples, for the method 1100, determining (e.g., by the data transformer 110) features 112 of the enriched sample 106 of the ascertained data 104 may further include determining, based on a semantic analysis of the enriched sample 106 of the ascertained data 104, a semantic profile of the enriched sample 106 of the ascertained data 104. Further, the method 1100 may include determining, based on a syntactic analysis of the enriched sample 106 of the ascertained data 104, a syntactic profile of the enriched sample 106 of the ascertained data 104. Further, the method 1100 may include determining, based on the semantic profile and the syntactic profile of the enriched sample 106 of the ascertained data 104, the features 112 of the enriched sample 106 of the ascertained data 104.

According to examples, for the method 1100, determining (e.g., by the data transformer 110), based on the semantic analysis of the enriched sample 106 of the ascertained data 104, the semantic profile of the enriched sample 106 of the ascertained data 104 may further include identifying tokens from the enriched sample 106 of the ascertained data 104. Further, the method 1100 may include normalizing the tokens by analyzing the tokens relative to a meaning of each of the tokens, and/or an abbreviation related to each of the tokens. Further, the method 1100 may include determining, based on an analysis of at least one of an ontology, a glossary, and a function classifier, a class vector that represents the semantic profile of each of the normalized tokens. The class vector may represent concepts associated with the normalized tokens.

According to examples, for the method 1100, determining (e.g., by the data transformer 110), based on the syntactic analysis of the enriched sample 106 of the ascertained data 104, the syntactic profile of the enriched sample 106 of the ascertained data 104 may further include identifying tokens from the enriched sample 106 of the ascertained data 104.

Further, the method 1100 may include normalizing the tokens by analyzing the tokens relative to a meaning of each of the tokens, and/or an abbreviation related to each of the tokens. Further, the method 1100 may include determining, based on an analysis of at least one of an ontology, a glossary, and a function classifier, an instance vector that represents the syntactic profile of each of the normalized tokens. The instance vector may represent patterns associated with the normalized tokens.

According to examples, for the method 1100, enriching (e.g., by the data iterator 108) the sample 106 of the ascertained data 104 may further include identifying missing parts of the sample 106 of the ascertained data 104. Further, the method 1100 may include completing the missing parts of the sample 106 of the ascertained data 104 based on historical data, and/or mathematical manipulations associated with the sample 106 of the ascertained data 104.

According to examples, for the method 1100, the at least one transformation 114 may include adding a human-readable label to a code in the sample 106 of the ascertained data 104. The human-readable label may represent a meaning of the code.

According to examples, validating (e.g., by the data munging validator 116) the at least one determined transformation 114 may further include determining whether historical data is similar to the enriched sample 106 of the ascertained data 104. Further, in response to a determination that the historical data is similar to the enriched sample 106 of the ascertained data 104, the method 1100 may include determining whether at least one transformation 114 applied to the historical data is similar to the at least one determined transformation 114. Further, in response to a determination that the at least one transformation 114 applied to the historical data are similar to the at least one determined transformation 114, the method 1100 may include indicating a validity of the at least one determined transformation 114.

Referring to FIGS. 1-10 and 12, and particularly FIG. 12, for the method 1200, at block 1202, the method may include ascertaining data 104 that is to be transformed.

At block 1204, the method may include determining based on an analysis of the ascertained data 104, a sample 106 of the ascertained data 104. The sample 106 of the ascertained data 104 may be less than the ascertained data 104.

At block 1206, the method may include enriching the sample 106 of the ascertained data 104.

At block 1208, the method may include determining features 112 of the enriched sample 106 of the ascertained data 104.

At block 1210, the method may include determining based on the features 112 of the enriched sample 106 of the ascertained data 104, at least one transformation 114 to be applied to the enriched sample 106 of the ascertained data 104 to transform the enriched sample 106 of the ascertained data 104 from a first format to a second format. The at least one transformation 114 may be determined from a plurality of available transformations.

At block 1212, the method may include generating based on the at least one determined transformation 114, at least one script 120 that may be applied to the ascertained data 104 to transform the ascertained data 104 from the first format to the second format.

Referring to FIGS. 1-10 and 13, and particularly FIG. 13, for the method 1300, at block 1306, the method may include ascertaining data 104 that is to be transformed.

At block 1308, the method may include determining, based on an analysis of the ascertained data 104, a sample 106 of the ascertained data 104. The sample 106 of the ascertained data 104 may be less than the ascertained data 104.

At block 1310, the method may include enriching the sample 106 of the ascertained data 104.

At block 1312, the method may include determining features 112 of the enriched sample 106 of the ascertained data 104.

At block 1314, the method may include determining, based on the features 112 of the enriched sample 106 of the ascertained data 104, at least one transformation 114 to be applied to the enriched sample 106 of the ascertained data 104 to transform the enriched sample 106 of the ascertained data 104 from a first format to a second format. The at least one transformation 114 may be determined from a plurality of available transformations.

At block 1316, the method may include generating, based on the at least one determined transformation 114, at least one script 120 that may be applied to the ascertained data 104 to transform the ascertained data 104 from the first format to the second format.

At block 1318, the method may include generating, based on an application of the script 120 to the ascertained data 104, a transformed version of the ascertained data 104.

At block 1318, the method may include identifying, based on the transformation of the ascertained data 104, an anomaly in the ascertained data 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An intelligent data munging system comprising:
   a data loader, executed by at least one hardware processor, to
      ascertain data that is to be transformed, and
      determine, based on an analysis of the ascertained data, a sample of the ascertained data, wherein the sample of the ascertained data is less than the ascertained data;
   a data iterator, executed by the at least one hardware processor, to enrich the sample of the ascertained data;
   a data transformer, executed by the at least one hardware processor, to
      determine features of the enriched sample of the ascertained data, and
      determine, based on the features of the enriched sample of the ascertained data, at least one transformation to be applied to the enriched sample of the ascertained data to transform the enriched sample of the ascertained data from a first format to a second format, wherein the at least one transformation is determined from a plurality of available transformations;
   a data munging validator, executed by the at least one hardware processor, to validate the at least one determined transformation by analyzing a similarity of a transformation applied to previously transformed data; and
   a script generator, executed by the at least one hardware processor, to generate, based on the validation of the at least one determined transformation, at least one script that is to be applied to the ascertained data to transform the ascertained data from the first format to the second format.

2. The intelligent data munging system according to claim 1, further comprising:
   a results generator, executed by the at least one hardware processor, to generate a display including the ascertained data and transformed data that is generated based on application of the at least one script to the ascertained data.

3. The intelligent data munging system according to claim 1, wherein the data transformer is to determine, based on the features of the enriched sample of the ascertained data, the at least one transformation to be applied to the enriched sample of the ascertained data to transform the enriched sample of the ascertained data from the first format to the second format by
   learning, based on previously determined features that are similar to the features of the enriched sample of the ascertained data, the at least one transformation, and
   determining, from the learning of the at least one transformation, the at least one transformation to be applied to the enriched sample of the ascertained data to transform the enriched sample of the ascertained data from the first format to the second format.

4. The intelligent data munging system according to claim 1, wherein the data transformer is to determine features of the enriched sample of the ascertained data by
   determining, based on a semantic analysis of the enriched sample of the ascertained data, a semantic profile of the enriched sample of the ascertained data,
   determining, based on a syntactic analysis of the enriched sample of the ascertained data, a syntactic profile of the enriched sample of the ascertained data, and
   determining, based on the semantic profile and the syntactic profile of the enriched sample of the ascertained data, the features of the enriched sample of the ascertained data.

5. The intelligent data munging system according to claim 4, wherein the data transformer is to determine, based on the semantic analysis of the enriched sample of the ascertained data, the semantic profile of the enriched sample of the ascertained data by
   identifying tokens from the enriched sample of the ascertained data,
   normalizing the tokens by analyzing the tokens relative to at least one of
      a meaning of each of the tokens, and
      an abbreviation related to each of the tokens, and
   determining, based on an analysis of at least one of an ontology, a glossary, and a function classifier, a class vector that represents the semantic profile of each of the normalized tokens, wherein the class vector represents concepts associated with the normalized tokens.

6. The intelligent data munging system according to claim 4, wherein the data transformer is to determine, based on the syntactic analysis of the enriched sample of the ascertained data, the syntactic profile of the enriched sample of the ascertained data by
   identifying tokens from the enriched sample of the ascertained data,
   normalizing the tokens by analyzing the tokens relative to at least one of
      a meaning of each of the tokens, and
      an abbreviation related to each of the tokens, and
   determining, based on an analysis of at least one of an ontology, a glossary, and a function classifier, an instance vector that represents the syntactic profile of each of the normalized tokens, wherein the instance vector represents patterns associated with the normalized tokens.

7. The intelligent data munging system according to claim 1, wherein the data iterator is to enrich the sample of the ascertained data by
   identifying missing parts of the sample of the ascertained data, and
   completing the missing parts of the sample of the ascertained data based on at least one of historical data, and mathematical manipulations associated with the sample of the ascertained data.

8. The intelligent data munging system according to claim 1, wherein the at least one transformation includes adding a human-readable label to a code in the sample of the ascertained data, wherein the human-readable label represents a meaning of the code.

9. The intelligent data munging system according to claim 1, wherein the data munging validator is to validate the at least one determined transformation by
   determining whether historical data is similar to the enriched sample of the ascertained data,
   in response to a determination that the historical data is similar to the enriched sample of the ascertained data, determining whether at least one transformation applied to the historical data is similar to the at least one determined transformation, and
   in response to a determination that the at least one transformation applied to the historical data are similar to the at least one determined transformation, indicating a validity of the at least one determined transformation.

10. A method for intelligent data munging, the method comprising:
   ascertaining, by at least one hardware processor, data that is to be transformed;
   determining, by the at least one hardware processor, based on an analysis of the ascertained data, a sample of the ascertained data, wherein the sample of the ascertained data is less than the ascertained data;
   enriching, by the at least one hardware processor, the sample of the ascertained data;
   determining, by the at least one hardware processor, features of the enriched sample of the ascertained data;
   determining, by the at least one hardware processor, based on the features of the enriched sample of the ascertained data, at least one transformation to be applied to the enriched sample of the ascertained data to transform the enriched sample of the ascertained data from a first format to a second format, wherein the at least one transformation is determined from a plurality of available transformations;
   validating, by the at least one hardware processor, the at least one determined transformation by analyzing a similarity of a transformation applied to previously transformed data; and
   generating, by the at least one hardware processor, based on the validation of the at least one determined transformation, at least one script that is to be applied to the ascertained data to transform the ascertained data from the first format to the second format.

11. The method according to claim 10, wherein validating the at least one determined transformation further comprises:
   determining whether historical data is similar to the enriched sample of the ascertained data;

in response to a determination that the historical data is similar to the enriched sample of the ascertained data, determining whether at least one transformation applied to the historical data is similar to the at least one determined transformation; and in response to a determination that the at least one transformation applied to the historical data are similar to the at least one determined transformation, indicating a validity of the at least one determined transformation.

12. The method according to claim 10, wherein determining, based on the features of the enriched sample of the ascertained data, the at least one transformation to be applied to the enriched sample of the ascertained data to transform the enriched sample of the ascertained data from the first format to the second format, further comprises:

learning, based on previously determined features that are similar to the features of the enriched sample of the ascertained data, the at least one transformation; and determining, from the learning of the at least one transformation, the at least one transformation to be applied to the enriched sample of the ascertained data to transform the enriched sample of the ascertained data from the first format to the second format.

13. The method according to claim 10, wherein determining the features of the enriched sample of the ascertained data further comprises:

determining, based on a semantic analysis of the enriched sample of the ascertained data, a semantic profile of the enriched sample of the ascertained data;

determining, based on a syntactic analysis of the enriched sample of the ascertained data, a syntactic profile of the enriched sample of the ascertained data; and determining, based on the semantic profile and the syntactic profile of the enriched sample of the ascertained data, the features of the enriched sample of the ascertained data.

14. The method according to claim 13, wherein determining, based on the semantic analysis of the enriched sample of the ascertained data, the semantic profile of the enriched sample of the ascertained data further comprises:

identifying tokens from the enriched sample of the ascertained data;

normalizing the tokens by analyzing the tokens relative to at least one of
a meaning of each of the tokens, and
an abbreviation related to each of the tokens; and determining, based on an analysis of at least one of an ontology, a glossary, and a function classifier, a class vector that represents the semantic profile of each of the normalized tokens, wherein the class vector represents concepts associated with the normalized tokens.

15. The method according to claim 13, wherein determining, based on the syntactic analysis of the enriched sample of the ascertained data, the syntactic profile of the enriched sample of the ascertained data further comprises:

identifying tokens from the enriched sample of the ascertained data;

normalizing the tokens by analyzing the tokens relative to at least one of
a meaning of each of the tokens, and
an abbreviation related to each of the tokens; and determining, based on an analysis of at least one of an ontology, a glossary, and a function classifier, an instance vector that represents the syntactic profile of each of the normalized tokens, wherein the instance vector represents patterns associated with the normalized tokens.

16. The method according to claim 10, wherein enriching the sample of the ascertained data further comprises:

identifying missing parts of the sample of the ascertained data; and completing the missing parts of the sample of the ascertained data based on at least one of historical data, and mathematical manipulations associated with the sample of the ascertained data.

17. A non-transitory computer readable medium having stored thereon machine readable instructions to provide intelligent data munging, the machine readable instructions, when executed, cause a processor to:

ascertain data that is to be transformed;

determine, based on an analysis of the ascertained data, a sample of the ascertained data, wherein the sample of the ascertained data is less than the ascertained data;

enrich the sample of the ascertained data;

determine features of the enriched sample of the ascertained data;

determine, based on the features of the enriched sample of the ascertained data, at least one transformation to be applied to the enriched sample of the ascertained data to transform the enriched sample of the ascertained data from a first format to a second format, wherein the at least one transformation is determined from a plurality of available transformations;

validate the at least one determined transformation by analyzing a similarity of a transformation applied to previously transformed data;

generate, based on the validation of the at least one determined transformation, at least one script that is to be applied to the ascertained data to transform the ascertained data from the first format to the second format;

generate, based on application of the script to the ascertained data, a transformed version of the ascertained data; and identify, based on the transformation of the ascertained data, an anomaly in the ascertained data.

18. The non-transitory computer readable medium of claim 17, wherein the machine readable instructions to determine the features of the enriched sample of the ascertained data, when executed, further cause the processor to:

determine, based on a semantic analysis of the enriched sample of the ascertained data, a semantic profile of the enriched sample of the ascertained data by
identifying tokens from the enriched sample of the ascertained data,
normalizing the tokens by analyzing the tokens relative to at least one of
a meaning of each of the tokens, and
an abbreviation related to each of the tokens, and
determining, based on an analysis of at least one of an ontology, a glossary, and a function classifier, a class vector that represents the semantic profile of each of the normalized tokens, wherein the class vector represents concepts associated with the normalized tokens;

determine, based on a syntactic analysis of the enriched sample of the ascertained data, a syntactic profile of the enriched sample of the ascertained data; and determine, based on the semantic profile and the syntactic profile of the enriched sample of the ascertained data, the features of the enriched sample of the ascertained data.

19. The non-transitory computer readable medium of claim 17, wherein the machine readable instructions to determine the features of the enriched sample of the ascertained data, when executed, further cause the processor to:
  determine, based on a semantic analysis of the enriched sample of the ascertained data, a semantic profile of the enriched sample of the ascertained data;
  determine, based on a syntactic analysis of the enriched sample of the ascertained data, a syntactic profile of the enriched sample of the ascertained data by
    identifying tokens from the enriched sample of the ascertained data,
    normalizing the tokens by analyzing the tokens relative to at least one of
      a meaning of each of the tokens, and
      an abbreviation related to each of the tokens, and
    determining, based on an analysis of at least one of an ontology, a glossary, and a function classifier, an instance vector that represents the syntactic profile of each of the normalized tokens, wherein the instance vector represents patterns associated with the normalized tokens; and
  determine, based on the semantic profile and the syntactic profile of the enriched sample of the ascertained data, the features of the enriched sample of the ascertained data.

20. The non-transitory computer readable medium of claim 17, wherein the machine readable instructions to enrich the sample of the ascertained data, when executed, further cause the processor to:
  identify missing parts of the sample of the ascertained data; and
  complete the missing parts of the sample of the ascertained data based on at least one of historical data, and mathematical manipulations associated with the sample of the ascertained data.

\* \* \* \* \*